(12) United States Patent　　　(10) Patent No.: US 12,239,223 B2
Trice et al.　　　(45) Date of Patent: Mar. 4, 2025

(54) MOUNTING BRACKET ASSEMBLY FOR APPLIANCE

(71) Applicant: Midea Group Co., Ltd., Foshan (CN)

(72) Inventors: Daniel J. Trice, Louisville, KY (US); Brian Langness, Shelbyville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 0 days.

(21) Appl. No.: 18/210,983

(22) Filed: Jun. 16, 2023

(65) Prior Publication Data

US 2023/0404260 A1　　Dec. 21, 2023

Related U.S. Application Data

(63) Continuation of application No. 17/353,654, filed on Jun. 21, 2021, now Pat. No. 12,064,033.

(51) Int. Cl.
*A47B 95/00*　　(2006.01)
*A47B 77/08*　　(2006.01)
*F16M 11/22*　　(2006.01)
*F16M 13/02*　　(2006.01)

(52) U.S. Cl.
CPC ............ *A47B 95/008* (2013.01); *A47B 77/08* (2013.01)

(58) Field of Classification Search
CPC .................. A47B 95/008; A47B 77/08; F16M 2200/027; F16M 2200/028; F16M 11/22; F16M 11/041; F16M 13/02; F16M 13/025
See application file for complete search history.

(56) References Cited

U.S. PATENT DOCUMENTS

| | | | |
|---|---|---|---|
| 3,627,248 | A | 12/1971 | Nelson |
| 3,804,211 | A | 4/1974 | Scherzinger |
| 3,814,363 | A | 6/1974 | Brelosky |
| 3,954,244 | A | 5/1976 | Gopstein |
| 3,970,273 | A | 7/1976 | Tanner |
| 4,012,058 | A | 3/1977 | Patton |
| 4,313,043 | A | 1/1982 | White |
| 4,327,274 | A | 4/1982 | White et al. |

(Continued)

FOREIGN PATENT DOCUMENTS

| | | |
|---|---|---|
| AT | 411925 B | 7/2004 |
| CN | 1704653 A | 12/2005 |

(Continued)

OTHER PUBLICATIONS

Sterling, Amy Jo., United States Patent and Trademark Office, Notice of Allowance issued in U.S. Appl. No. 17/089,196, 46 pages, dated Aug. 2, 2023.

(Continued)

*Primary Examiner* — Bayan Salone
(74) *Attorney, Agent, or Firm* — Gray Ice Higdon

(57) ABSTRACT

A mounting bracket assembly for an appliance, such as an over-the-range cooking appliance, for mounting to an underside of a wall cabinet, where the cooking appliance includes having at least a rear-facing side and a top-facing side. The assembly includes a wall bracket configured to be secured to the wall near the wall cabinet and configured to support the enclosure on a ledge. The assembly also includes a cam rotatably mounted to the housing to rotatably engage a surface of the ledge to raise the appliance.

21 Claims, 19 Drawing Sheets

(56) References Cited

U.S. PATENT DOCUMENTS

| | | | |
|---|---|---|---|
| 4,453,690 | A | 6/1984 | Takeuji |
| 4,457,436 | A | 7/1984 | Kelley |
| 4,465,256 | A | 8/1984 | Wolbrink et al. |
| 4,580,853 | A | 4/1986 | Hitzeroth et al. |
| 4,584,986 | A | 4/1986 | Cannata |
| 4,635,615 | A | 1/1987 | Itoh et al. |
| 4,659,047 | A | 4/1987 | Haller |
| 4,666,113 | A | 5/1987 | Itoh et al. |
| 4,720,622 | A | 1/1988 | Iwata et al. |
| 4,753,406 | A | 6/1988 | Kodama et al. |
| 4,795,121 | A | 1/1989 | Comito |
| 4,796,850 | A | 1/1989 | Aramaki |
| 4,824,061 | A | 4/1989 | Sumikama et al. |
| 4,898,149 | A | 2/1990 | Cohn |
| 5,014,945 | A | 5/1991 | Miller |
| 5,096,230 | A | 3/1992 | Pausch et al. |
| 5,257,468 | A | 11/1993 | Lebrun |
| 5,482,232 | A * | 1/1996 | Wynn ............... A47B 81/06 248/222.51 |
| 5,590,641 | A | 1/1997 | Duong |
| 5,676,440 | A | 10/1997 | Garber et al. |
| 6,018,158 | A | 1/2000 | Kang |
| 6,222,171 | B1 | 4/2001 | Fukuda et al. |
| 6,341,754 | B1 | 1/2002 | Melito et al. |
| 6,369,372 | B1 | 4/2002 | Kim |
| 6,512,214 | B2 | 1/2003 | Jeong et al. |
| 6,554,880 | B1 | 4/2003 | Northcutt |
| 6,584,702 | B2 | 7/2003 | Irey |
| 6,660,984 | B1 | 12/2003 | Jeong et al. |
| 6,737,622 | B1 | 5/2004 | Jeong et al. |
| 6,894,259 | B2 | 5/2005 | Lee |
| 6,894,260 | B2 | 5/2005 | Yamauchi |
| 7,030,348 | B1 | 4/2006 | Kim |
| 7,129,452 | B2 | 10/2006 | Cho |
| 7,282,683 | B2 | 10/2007 | Yamauchi et al. |
| 7,348,527 | B2 * | 3/2008 | Braunisch ............ H05B 6/6423 219/757 |
| 9,243,734 | B2 | 1/2016 | Aubert et al. |
| 9,719,251 | B2 | 8/2017 | Gosling |
| 9,897,330 | B2 | 2/2018 | Bruin-Slot et al. |
| 9,897,331 | B2 | 2/2018 | Zachary |
| 10,018,365 | B2 | 7/2018 | Bruin-Slot et al. |
| 10,145,054 | B2 | 12/2018 | Federico |
| 10,302,308 | B2 * | 5/2019 | Peng ............... F24C 15/2021 |
| 10,317,093 | B2 | 6/2019 | Bruin-Slot et al. |
| 10,539,329 | B2 | 1/2020 | Gauthier et al. |
| 10,633,783 | B1 * | 4/2020 | Kelley ............... D06F 58/20 |
| 10,660,438 | B2 | 5/2020 | Hognaland |
| 10,663,175 | B2 | 5/2020 | Jang |
| 10,709,240 | B2 | 7/2020 | Hira et al. |
| 11,460,193 | B2 | 10/2022 | Gayakwad |
| 11,519,611 | B2 * | 12/2022 | Gauthier ............ F24C 15/2028 |
| 11,864,296 | B2 * | 1/2024 | Scalf ............... H05B 6/6429 |
| 2005/0178763 | A1 | 8/2005 | Yamauchi |
| 2009/0252548 | A1 | 10/2009 | Laible |
| 2016/0003270 | A1 | 1/2016 | Franklin |
| 2016/0195279 | A1 | 7/2016 | Naber |
| 2016/0341432 | A1 * | 11/2016 | Sinur ............... F24C 15/2071 |
| 2017/0065077 | A1 | 3/2017 | Behroozi |
| 2018/0192807 | A1 | 7/2018 | Hall |
| 2018/0340695 | A1 | 11/2018 | Park |
| 2019/0113241 | A1 | 4/2019 | Zhang et al. |
| 2019/0203881 | A1 | 7/2019 | Wu |
| 2019/0223593 | A1 | 7/2019 | Hira |
| 2020/0224676 | A1 | 7/2020 | Gazerro |
| 2020/0292291 | A1 * | 9/2020 | Duz ............... G01B 3/14 |
| 2020/0373743 | A1 | 11/2020 | Chambers |
| 2022/0141927 | A1 | 5/2022 | Scalf et al. |
| 2022/0400850 | A1 | 12/2022 | Trice |
| 2022/0400860 | A1 | 12/2022 | Trice |
| 2022/0404030 | A1 | 12/2022 | Trice |
| 2022/0404031 | A1 | 12/2022 | Trice |
| 2024/0147584 | A1 | 5/2024 | Scalf |
| 2024/0423363 | A1 * | 12/2024 | Trice ............... A47B 77/08 |

FOREIGN PATENT DOCUMENTS

| | | |
|---|---|---|
| CN | 108344018 A | 7/2018 |
| CN | 210241107 U | 4/2020 |
| DE | 3839931 A1 | 5/1990 |
| DE | 4340255 A1 | 6/1995 |
| DE | 10128026 A1 | 12/2002 |
| DE | 10357575 A1 | 7/2004 |
| DE | 102005057153 A1 | 5/2007 |
| DE | 102005057160 A1 | 5/2007 |
| DE | 102010055986 A1 | 5/2012 |
| EP | 0130029 A1 | 1/1985 |
| GB | 2142669 A | 1/1985 |
| KR | 880000748 Y1 | 3/1988 |
| KR | 880002241 Y1 | 6/1988 |
| KR | 19980030344 U | 8/1998 |
| KR | 19980030345 U | 8/1998 |
| KR | 19980036833 U | 9/1998 |
| KR | 19990032462 A | 5/1999 |
| KR | 20000010025 A | 2/2000 |
| KR | 100244311 B1 | 3/2000 |
| KR | 20010055487 A | 7/2001 |
| KR | 200271639 Y1 | 4/2002 |
| KR | 20030059878 A | 7/2003 |
| KR | 20070065133 A | 6/2007 |
| KR | 20080057729 A | 6/2008 |
| KR | 20110002949 U | 3/2011 |

OTHER PUBLICATIONS

Tran-Le, Thao Uyen, Non-Final Office Action issued in U.S. Appl. No. 17/353,647, 111 pages, dated Apr. 26, 2024.
Bargero, John E., United States Patent and Trademark Office, Final Office Action issued in U.S. Appl. No. 17/353,666, 36 pages, dated May 14, 2024.
Bargero, John E., United States Patent and Trademark Office, Non-Final Office Action issued in U.S. Appl. No. 17/353,666, 53 pages, dated Nov. 6, 2023.
Tran-Le, Thao Uyen, United States Patent and Trademark Office, Final Office Action issued in U.S. Appl. No. 17/353,647, 51 pages, dated Aug. 15, 2024.
Majestic, Majestic BKTLA7C LED TV Wall Mount Slide Bracket for Easy TV Removal, Retrieved from: https://majesticelectronics.us/tv-mounts/16-majesetic-bktla7c-led-tv-wall-mount-bracket-easy-remove.html , Retrieved on Oct. 27, 2020.
Transmittal of Related Applications dated Jun. 16, 2023.
Nardi, Tom, 3D Printed Magnetic Dust Port Keeps Shop Clean, Hackaday, Aug. 29, 2018.
Namay, Daniel Elliot, Non-Final Office Action issued in U.S. Appl. No. 17/353,671, 218 pages, dated Jan. 18, 2024.
Fulton Store, Side Mount Heavy Duty Steel Furniture Leg Leveling Feet, Adjustable Height with Round Foot Ideal for Desks, Tables, Shelving Units, Shop Cabinets and Furniture, retrieved from: https://www.amazon.com/Adjustable-Furniture-Levelers-Shelving-Cabinets/dp/B06ZXSXL5Z, Retrieved on: Jun. 9, 2023.
Mason Ind., 20,000 lb Capacity, 3-1/2 Wide x 6" Long, 1/2" Pad, Wedge Jack, retrieved from: https://www.mscdirect. com/product/details/88000906; Retrieved on: Jan. 30, 2023.
Wobble Wedges Store, Wobble Wedge BigGap Rigid Plastic Shims, Multipurpose Wdges for Home Improvement & Work, Leveling Pads for Large Gaps & Heavy Loads, Furniture Appliance Levelers, Retrieved from: https://www.amazon.com/Wobble-Wedges-BigGap-Plastic-Shims/dp/B08KVV6JRM?th=1; Retrieved on: Jan. 30, 2023.
Salone, Bayan, United States Patent and Trademark Office, Notice of Allowance issued in U.S. Appl. No. 17/353,654, 150 pages, dated Apr. 10, 2024.
Bargero, John E., United States Patent and Trademark Office, Non-Final Office Action issued in U.S. Appl. No. 17/353,666, 40 pages, dated Sep. 29, 2024.
Sterling, Amy Jo, United States Patent and Trademark Office, Non-Final Office Action issued in U.S. Appl. No. 18/400,809, 54 pages, dated Nov. 12, 2024.

* cited by examiner

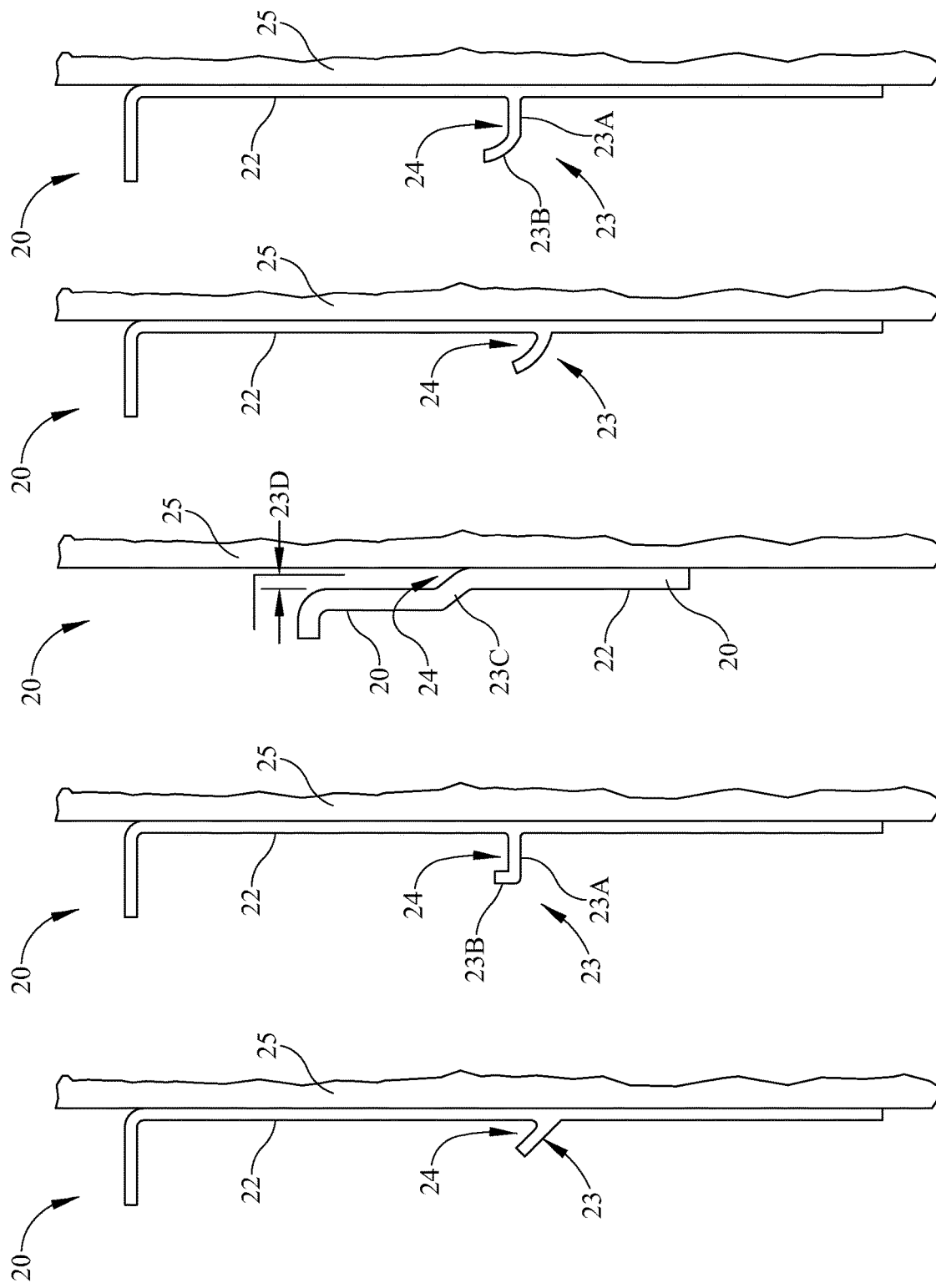

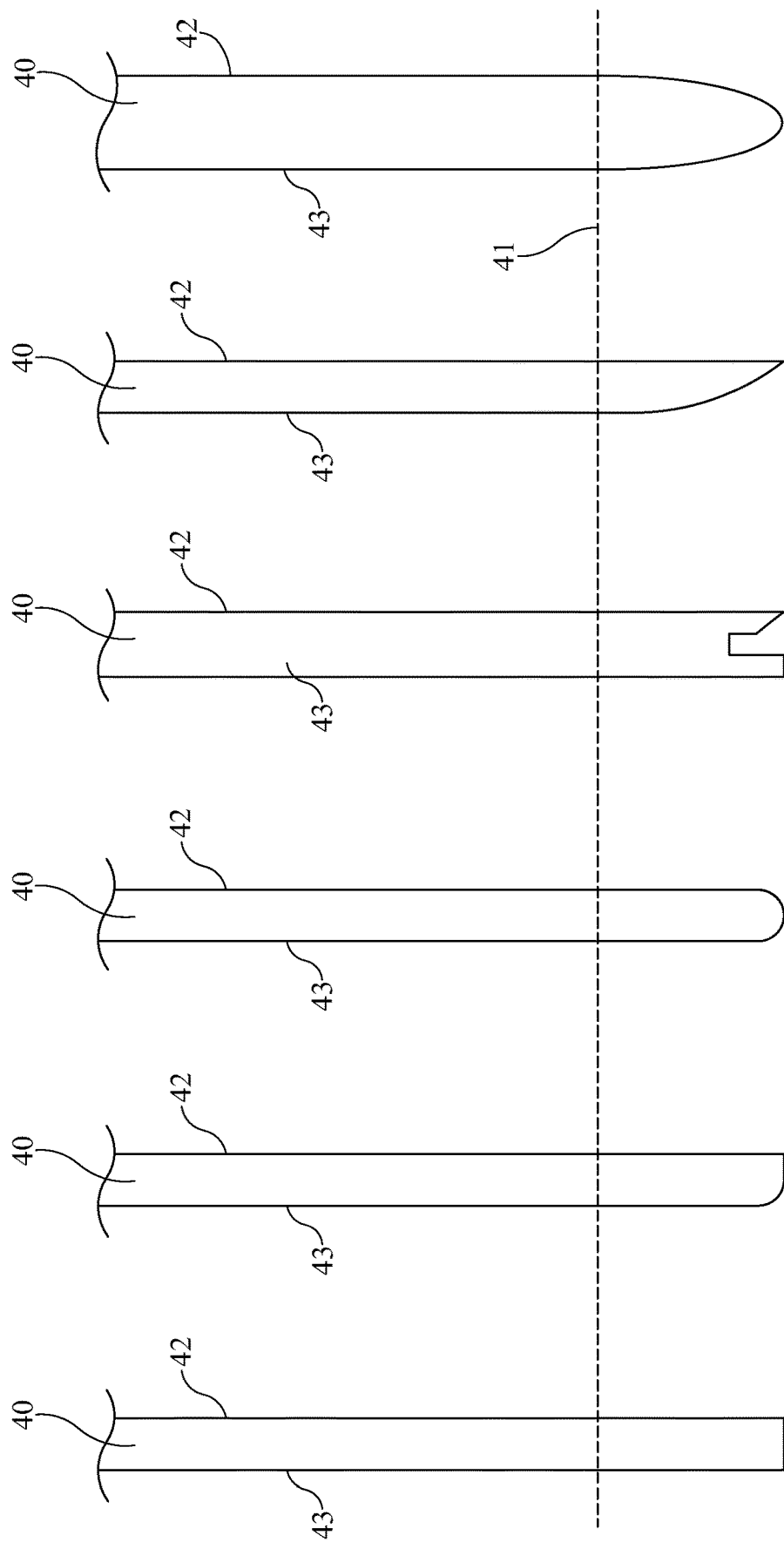

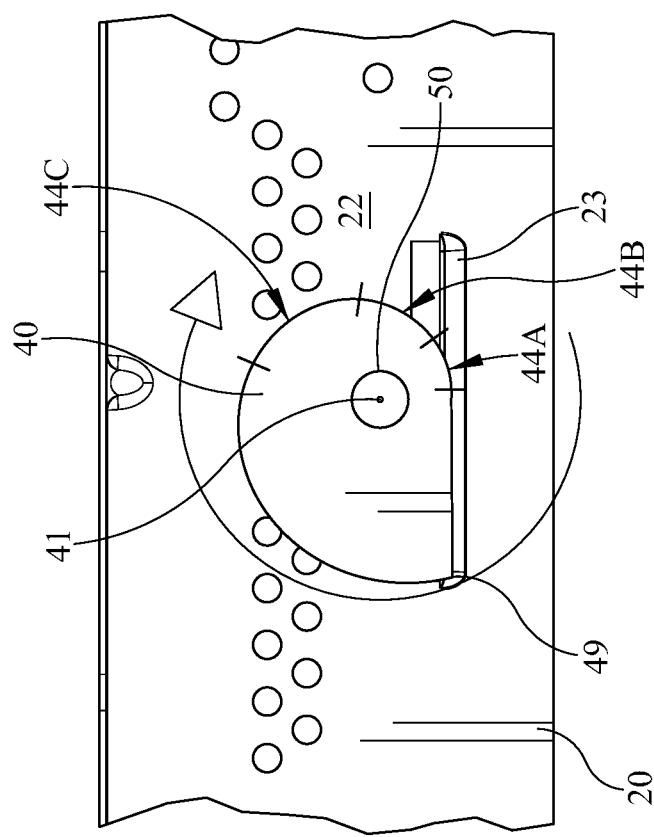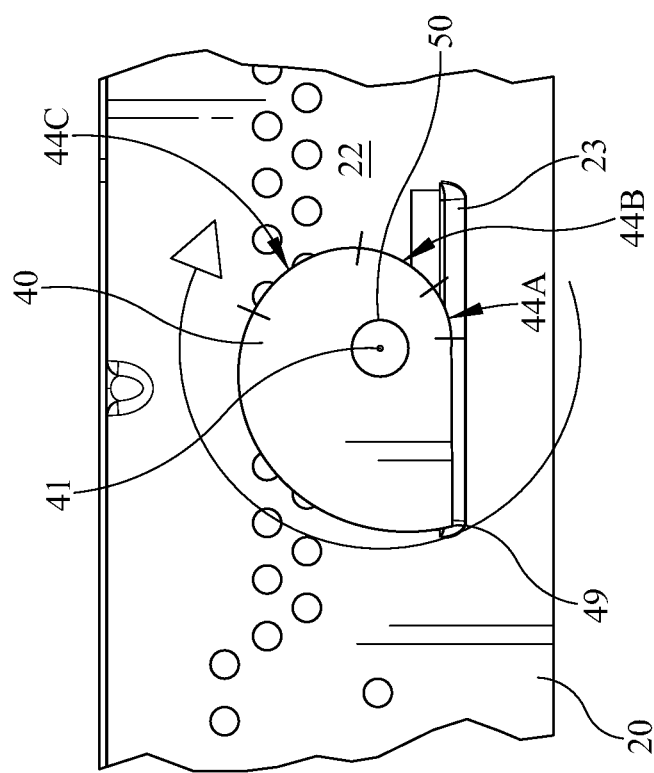
FIG. 10A

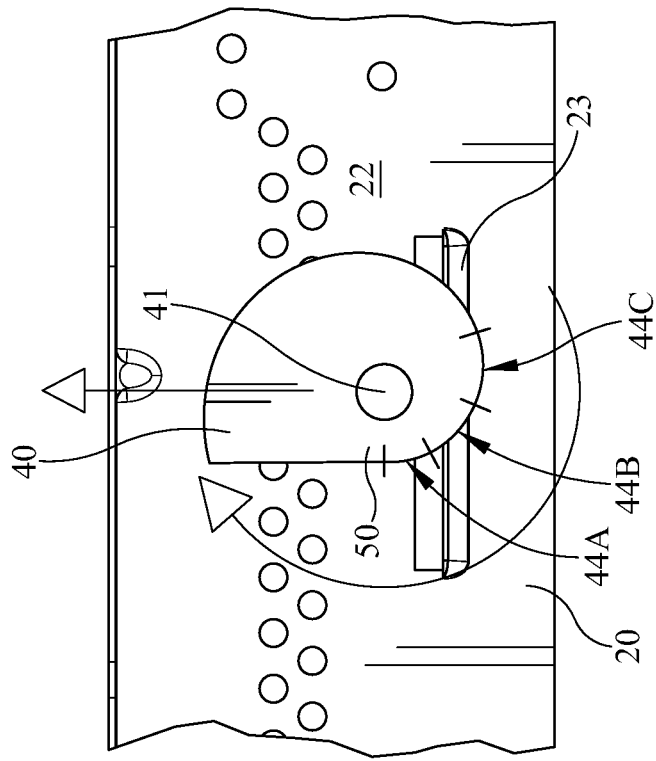
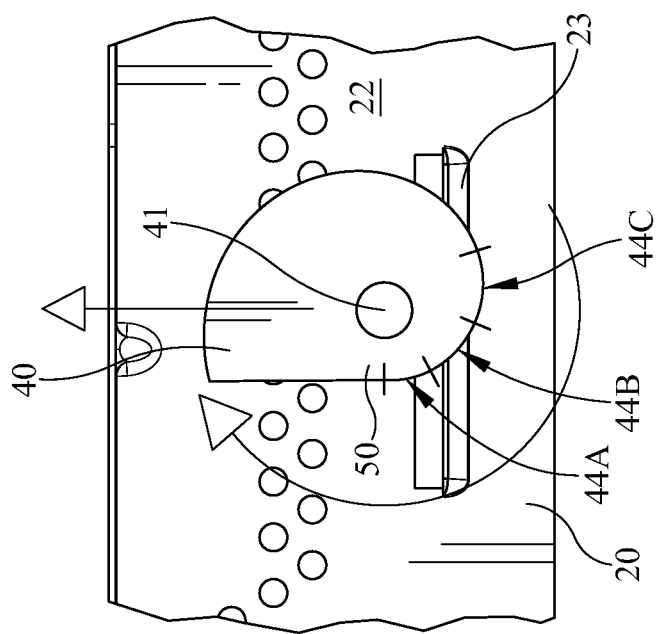
FIG. 10B

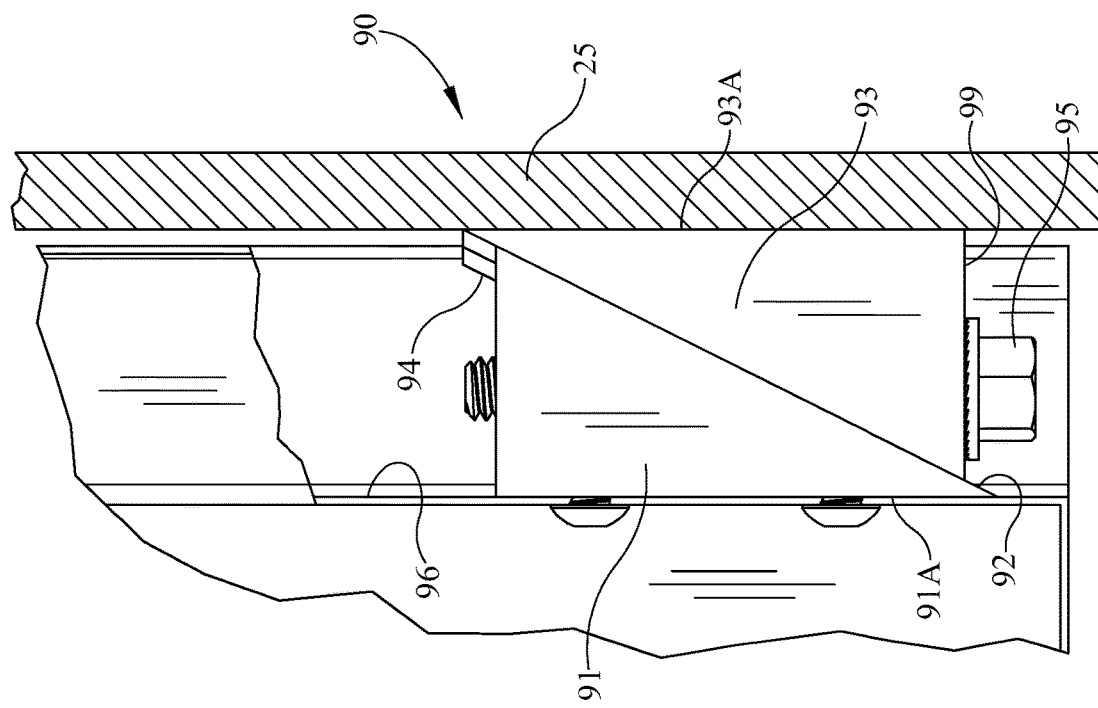

MOUNTING BRACKET ASSEMBLY FOR APPLIANCE

CROSS-REFERENCE TO RELATED APPLICATIONS

This application is related to the following applications, each of which is filed on even date herewith and assigned to the same assignee as the present application: U.S. patent application Ser. No. 17/353,647 entitled "A Microwave Cooking Appliance Having a Connector System for an External Vent"; U.S. patent application Ser. No. 17/353,666 entitled "Mounting Bracket for Over-the-Range Cooking Appliance"; and U.S. patent application Ser. No. 17/353,671 entitled "Mounting Bracket for Over-the-Range Cooking Appliance with Drill Guide". The disclosures of each of these applications are incorporated by reference herein.

BACKGROUND

Appliances, and in particular cooking appliances such as microwaves, ovens, and the like, are commonly used for residential cooking, and are often installed on a wall, and often over a range, cooktop, or counter. The installation of cooking appliance over a range or cooktop is a lengthy process and often requires two individuals to complete. Furthermore, installation of these units may necessitate drilling many holes into the surrounding cabinetry. The typical installation involves a consumer utilizing a template to locate the mounting holes for a wall bracket and for the holes that must be drilled through the upper cabinet in order to hold the appliance in place. Once the wall bracket is located and mounted, one or both persons must lift the appliance onto the wall bracket and hang the unit from the wall bracket and then hold the unit, while another person inserts the mounting screws through the upper cabinet and threads them into place into the top of the appliance.

Accordingly, a need continues to exist in the art for a manner of simplifying mounting of an appliance to a wall.

SUMMARY

The herein-described embodiments address these and other problems associated with the art by providing a mounting bracket and appliance that is configured for mounting to a wall. The bracket includes a ledge depending outwardly therefrom. The appliance includes a cam rotatably coupled thereto that is received on the ledge.

In a first aspect, a mounting assembly for mounting an appliance to a wall comprises a first bracket having a wall-facing surface and an appliance-facing surface and at least one ledge protruding outwardly away from the wall-facing surface at a ledge angle. The appliance has a top surface, a bottom surface, a rear surface, side surfaces, and a front surface, wherein the rear surface further comprises a cam having a cam axis and an outer camming surface with increasing radius therealong. The cam is rotatably coupled to rotate about the cam axis from a cam home position through a range of intermediate cam positions to a final cam position. The cam may occupy the cam home position when the appliance is coupled to the first bracket by positioning the cam over top of the ledge. The cam may occupy the final cam position after the cam has been rotated by a user a predetermined amount.

In another aspect, a mounting assembly for mounting an appliance to a wall comprises a first bracket having a wall-facing surface and an appliance-facing surface and at least one ledge protruding outwardly away from the wall-facing surface at a ledge angle. A second bracket for coupling to an appliance is provided, the said bracket having at least one bracket receiving opening disposed therein. The at least one bracket receiving opening may have an opening top surface and the bracket receiving opening is alignable with the at least one ledge to receive the ledge under the opening top surface when the second bracket occupies a first position relative to the first bracket. The second bracket is moveable by a user to a second position relative to the first bracket to place the opening top surface in contact with the ledge. A cam having a cam axis and an outer camming surface with increasing radius therealong is provided. The cam may be rotatably coupled to the second bracket above the at least one bracket receiving opening. The cam may be rotatable about the cam axis from a cam home position through a range of intermediate cam positions to a final cam position. The cam may occupy the cam home position when the second bracket occupies the first position relative to the first bracket.

In another aspect, a wall-mountable appliance for mounting beneath an obstacle is provided. The appliance may comprise an enclosure including a cooking cavity configured to receive food, wherein the enclosure includes at least a rear side and a top side. A first bracket is provided that can be secured to a wall and that has a ledge projecting outwardly therefrom. A cam is rotatably coupled to the rear side, and the cam has a cam axis about which the cam rotates. The cam may have an outer camming surface having an increasing radius in one direction of rotation. The camming surface may contact the ledge as the cam is rotated to move the appliance vertically away from the ledge.

In another aspect, a method for installing an appliance on a wall beneath an obstacle is provided, wherein the appliance includes an enclosure with a cooking cavity configured to receive food, and the enclosure includes at least a rear side and a top side. The method comprises installing a first bracket on a wall, wherein the first bracket has a ledge that depending outwardly therefrom and includes a ledge support surface. The method also includes providing an appliance with a cam rotatably coupled thereto, wherein the cam further includes a camming surface having increasing radii therealong in a radial direction. The method also includes placing the appliance onto the first bracket by positioning the cam over the ledge. The method also includes allowing the appliance to move vertically downwardly until the cam rests on the ledge support surface and rotating the cam to bring the increasing radii of the camming surface into contact with the ledge support surface. The method may also include continuing to rotate the cam until a maximum radius of the camming surface is in contact with the ledge support surface.

These and other advantages and features, which characterize the invention, are set forth in the claims annexed hereto. For a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 4A-4E are schematic side views showing various alternative embodiments of a first bracket.

FIGS. 9A-9F are schematic side views of various alternative embodiments of a cam.

FIG. 10A is a front view of the cams of an appliance in a home position, with the appliance having been removed for clarity, with arrows indicating rotation, according to an embodiment.

FIG. 10B is a similar view as FIG. 10A, but showing the cams having been rotated to the final position.

FIG. 15B a side view in partial cutaway of the wedge screw mechanism of FIG. 15A, showing the first wedge in a first spatial relationship to the second wedge.

DETAILED DESCRIPTION

Figure 1:
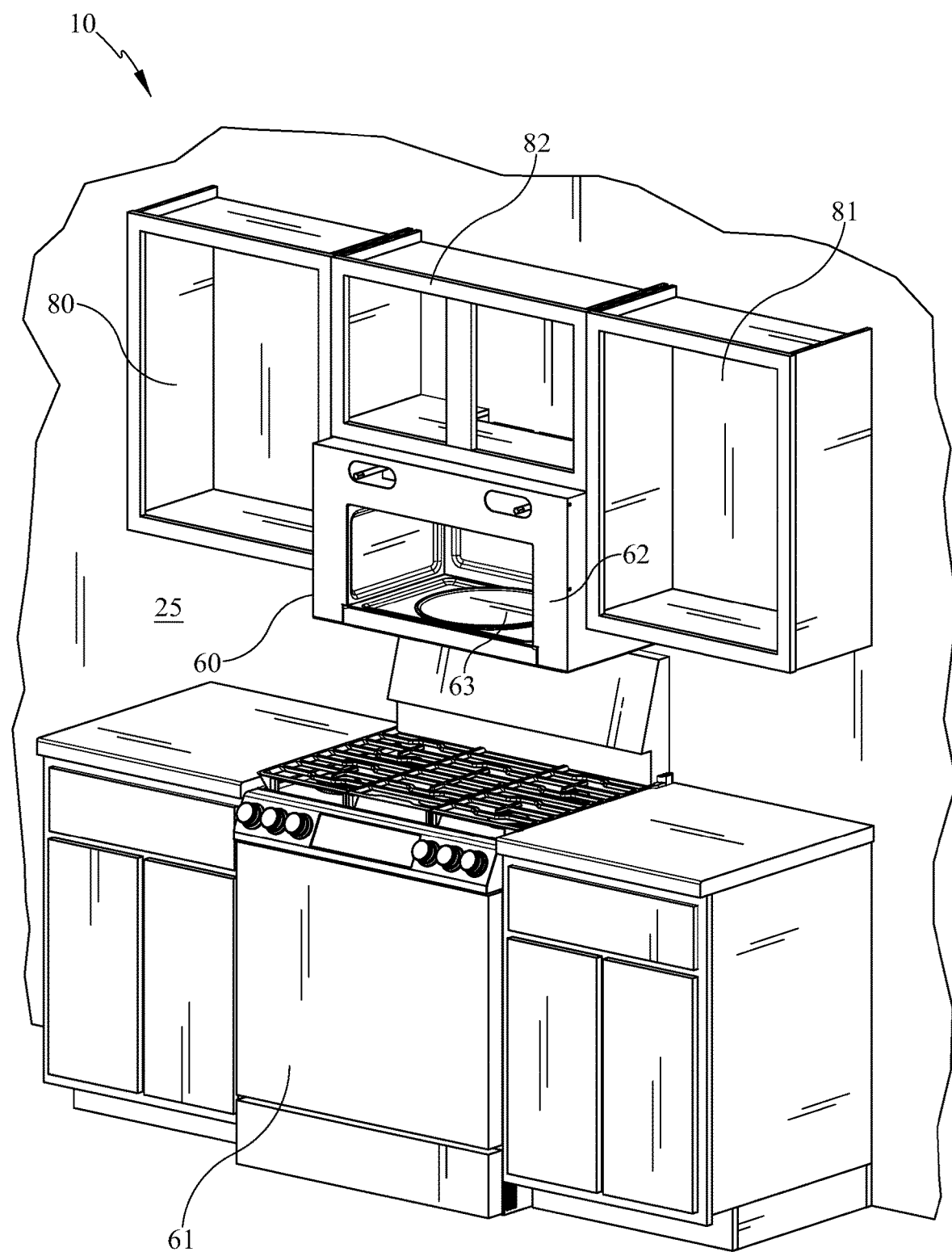
FIG. 1 is a perspective view of an over the range appliance in a typical cabinet environment, according to an embodiment.

The embodiments discussed hereinafter are directed in part to an over-the-counter cooking appliance, mounting bracket, mounting kit, and method therefor that utilize a bracket that is mounted on a wall and that incorporates one or more ledges, and a cam mounted on an appliance having a camming surface rotatably moveable thereon that interacts with the one or more ledges. The cam can be incorporated into the rear surface of the appliance, or can be mounted on a second bracket that is itself mounted to the rear of the appliance. The functionality of the improved system is a significant improvement over a standard "French cleat" type connection. The system described herein enable the appliance not only to be situated on and be supported by a ledge, but also to be raised thereafter to move the appliance from a first position through a range of positions into a final position. The illustrated embodiments hereinafter focus on a cooking appliance, in this case a microwave cooking appliance, but it will be appreciated that the herein-described techniques may be used to mount other types of items, not necessarily appliances, and in other types of locations, not just over-the-range or over-the-counter (commonly referred to as "OTR" appliances). Therefore, the invention is not limited to use solely with microwave cooking appliances, albeit this is a common application, so the figures will depict this common application.

As described previously, OTR microwave cooking appliances typically require multiple people to install. A first person (and indeed many times two people) may be required to lift and/or hold the microwave in place, for example on a wall bracket, while a second person may be required to insert one or more mounting screws downwardly through a bottom of the upper wall cabinet, and thread the screws into the OTR microwave cooking appliance. Common mounting bracket systems for OTR appliances require a wall bracket mounted to a back wall (behind the appliance) as well as screws or bolts drilled through an upper cabinet that fasten the appliance to the upper cabinet and enable the appliance to be drawn up tight against a lower side of the upper cabinet. There continues to be a need for a manner of mounting such a cooking appliance and hardware for the same that would allow a single person to install, or even if multiple people participate in the installation, to substantially simplify the installation process. Additionally, there is a need for an OTR microwave mounting system to not require drilling holes through the upper cabinet in order to support the OTR microwave or to draw the OTR appliance up to the lower side of the upper cabinet.

An improved OTR microwave cooking appliance mounting bracket assembly that can be installed more easily, and in many instances by a single person, is described herein, which eliminates the need to locate and drill holes into the upper cabinet to support the appliance and/or draw the appliance up tight against a bottom surface of the upper cabinet. The embodiments herein offer an improvement over standard "French cleat" style structures. In general terms, and as is commonly understood, a French cleat is a two-component system that includes a first bracket mounted to a wall that contains an upper surface that is angled downwardly toward the wall (typically at about a 30 to 45 degree angle), and a second bracket mounted to the "appliance" (generally, whatever item desired to be mounted to the wall), that has a lower surface that is angled upwardly toward the appliance, at an angle that matches the angle of the first bracket. The two angled surfaces engage when the appliance is placed onto the first bracket, and the engaging angled surfaces prevent the appliance from movement in the downward direction, as well as in a direction perpendicular to the wall. In this manner, once the appliance is simply placed onto the first bracket, the appliance is supported from movement, and allows the user to let go of the appliance without fear of it falling off the wall.

However, for mounting appliances to a wall beneath an obstacle (such as an upper cabinet or trim or other obstacle), French cleats typically are not used because, once the appliance is placed onto the wall bracket of a typical French cleat, there is necessarily a gap between the bottom of the upper cabinet and the top of the appliance. This gap is present because the appliance, in order to be placed onto the wall bracket, must have room to clear the top of the angle of the wall bracket in order to be placed thereon, but then must move downwardly on the wall bracket until the appliance bracket fully seats and the angled surfaces fully engage. The size of the gap that remains is directly related to the height differential between the top and bottom of the angled surfaces of the two brackets. The embodiments described herein are an improvement to such bracket systems.

The embodiments shown and described include a cam in the bracket assembly that closes the gap between the top of the appliance and the bottom surface of the obstacle (depicted in the figures as a typical upper cabinet). In the embodiments shown, the mating cam lock system is integral to the appliance and is recessed in the appliance rear face to allow the wall bracket and appliance rear face to be in surface contact with each other (basically, coplanar). As will be shown and described below, the cam locks are preferably, but not necessarily, accessed from the front of the microwave through openings through the microwave. As they are rotated, the locking cams close the gap between the bottom of the upper cabinet and top of the microwave case, all the while still providing attachment to the wall bracket through the interaction of a ledge surface of the wall bracket and a mating surface of the appliance (or of a second bracket coupled to the appliance). This also prevents the microwave from falling vertically off the wall. In alternative embodiments, if there is still a gap between the upper cabinet and the top of the microwave after full cam rotation has been achieved, one or more "wedge screws" for fine tuning the gap are located at or near the bottom rear of the microwave to create a force to rotate the top front edge of the microwave case up and close the gap. The wall bracket and/or the microwave bracket can be stamped metal or an extruded aluminum member, as two examples. For other embodiments, such as, for example, cabinets, tools, shelves, or other items desired to be hung on a wall below an obstacle, the brackets can be made of wood, plastic, other metal, or other materials.

Turning now to the drawings, wherein like numbers denote like parts throughout the several views, FIG. 1 illustrates an example appliance 60 mounted in a typical OTR location in which the various apparatus, systems, and methods using the mounting bracket assembly 10 described herein may be implemented. Such OTR microwaves offer several advantages over a countertop microwave, including that they do not take up valuable counter space and they may provide a neater appearance to the kitchen. Additionally, OTR microwave cooking appliances may have built-in exhaust fans that serve as a stovetop ventilation system to minimize smoke, steam, and cooking odors. The appliance 60 illustrated in FIG. 1 is installed over the stove or range 61. FIG. 1 illustrates a typical cabinet layout or design, with a first wall cabinet 80 and a second wall cabinet 81 installed on a wall 25 with a space therebetween to receive the OTR appliance. Also between the first and second wall cabinets 80, 81 is an upper wall cabinet 82 below which the OTR appliance is to be mounted. The term wall cabinet refers to a cabinet typically disposed over a countertop or any cabinet not a base-type cabinet that typically supports a counter. Furthermore, the term "wall" may refer to any substantially vertical support structure, and that may be intermediate structures to which the wall bracket is directly attached. The upper wall cabinet 82 has a bottom surface 83. In some instances, the upper wall cabinet 82 may comprise or contain functional cabinetry for storage; while in other instances, it may be decorative or consist of just cabinet framing or other obstacle. The cabinet layout design illustrated in the Figures is not to be construed as limiting, and may vary based on the specifics of any particular kitchen layout. For example, in some instances, the over-the-range microwave may be flanked on one side by a wall (e.g. where the microwave is located in a corner) and on a second side by a cabinet, or one side may be open.

The appliance 60 shown is a residential-type microwave cooking appliance, and as such includes a housing or enclosure 62, which further includes a cooking cavity 63, as well as a door (which has been removed from FIG. 1 for more easy viewing of features of the embodiments) disposed adjacent the respective opening of the cooking cavity 63. In typical appliance embodiments, the door may further include a window that allows a user to view the items inside the cooking cavity 63. In some embodiments, in place of, or in addition to, the handle (not illustrated), the appliance 60 may include a button that a user may press to trigger the opening of the door.

Although not relevant to the features of the embodiments described herein, the typical appliance 60 may also include one or more user activated controls, which may be in the form of buttons, knobs, a touchscreen, or the like. In some embodiments, these user activated controls may be used to program a cooking time and/or a cooking power level. In addition, in some embodiments, these user activated controls may be used to select one or more preset conditions for a particular food item to be cooked or a particular desired action (e.g. "popcorn", "defrost", "frozen pizza", etc.). In some embodiments, the preset conditions may include one or more adaptive thermal sensing cycles such as an auto-defrost or auto-cook cycle, which are described in greater detailed herein. The appliance 60 may also include a display, which may be used to convey a variety of information to a user. For example, in some embodiments, the display may be used to display the time when the appliance 60 is not in use. In other embodiments, the display may be used to display cooking times, power levels and/or temperatures.

Figure 2:
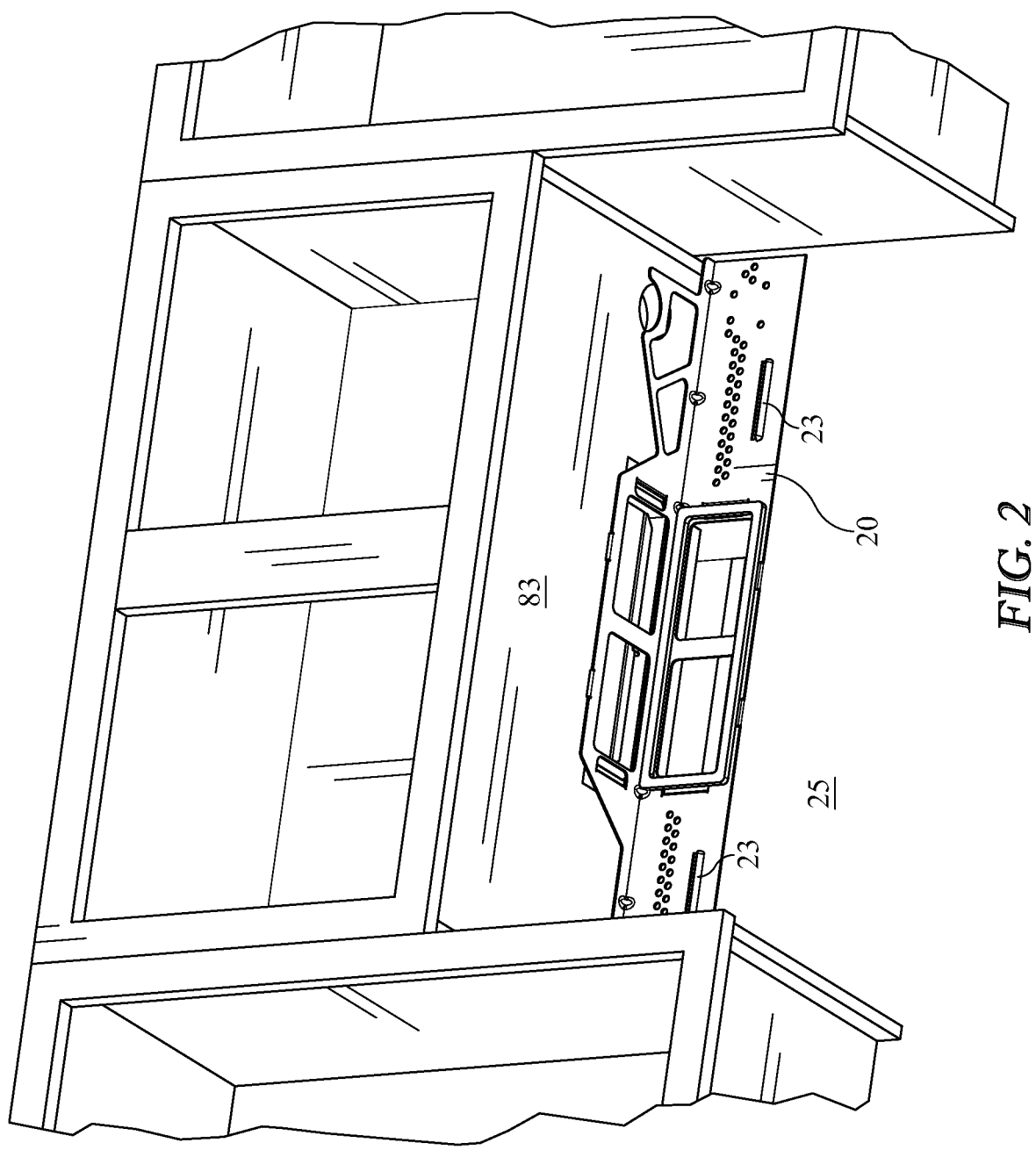
FIG. 2 is a bottom perspective view of the opening into which the appliance shown in FIG. 1 is to be mounted, showing a first bracket according to one embodiment.
Figure 3:
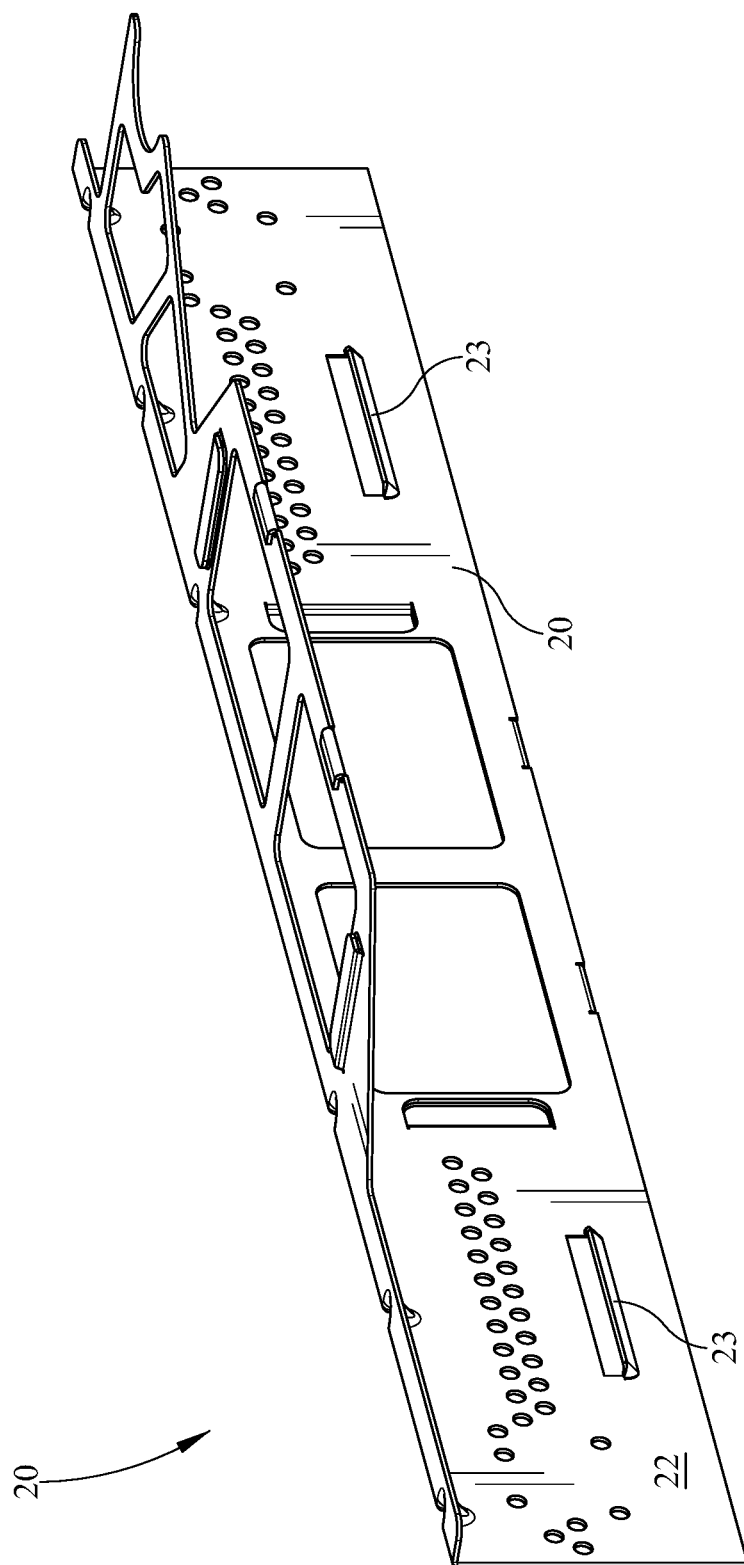
FIG. 3 is a bottom perspective view of a first bracket of FIG. 2 according to one embodiment.

Referring now to FIGS. 2 and 3, these figures illustrate exemplary wall bracket, or first bracket 20, that may be utilized to install an OTR appliance. First bracket 20 is secured to the wall 25 in known fashion (e.g., one or more screws or bolts fastened into the wall and/or into studs behind the wall 25). The first bracket 20 may, in some instances, be constructed of a stamped metal, including stainless steel, aluminum, or any other suitable metal, as discussed. The first bracket 20 may take many shapes and sizes, and may have additional features, structures, openings, and surfaces that comprise the first bracket 20, but typically will have a wall-facing surface 21 and an opposite appliance-facing surface 22. The first bracket 20 may also include a ledge 23 with a ledge support surface 24 that extends away from the appliance-facing surface 22 such that the ledge 23 projects outwardly away from the wall 25 when the first bracket 20 is installed on the wall 25. The ledge 23 may take many shapes and sizes. As shown in FIGS. 2 and 3, one example of ledge 23 can be a simple planar member that projects at a single, predetermined angle away from the appliance-facing surface 22, such the ledge support surface 24 projects at the predetermined angle. Such angles (measured from the vertical surface of the wall 25 outwardly in a sweeping manner downwardly toward the horizontal) can be from approximately 1 degree to approximately 90 degrees, but preferably is in the range from approximately 15 degrees to approximately 75 degrees, and most preferably is in the range of approximately 30 degrees to approximately 45 degrees. FIGS. 4A-4E depict several alternative embodiments of the first bracket 20 and of ledge 23. For example, FIG. 4A shows an extruded first bracket 20 having a ledge 23 that is a planar projection away from wall 25 and is disposed at an angle of about 45 degrees. Ledge 23 can alternatively comprise a multi-planar surface. For example, FIG. 4B shows an extruded first bracket 20 having a ledge 23 that comprises a ledge first portion 23A and a ledge second portion 23B. As shown in the figure, ledge first portion 23A depends away from the wall 25 at a first angle (as shown, approximately horizontally), and ledge second portion 23B depends from an end of ledge first portion 23A at a second angle different from the first angle (as shown, approximately vertically). FIG. 4C shows an alternative embodiment of an extruded or a formed first bracket 20 wherein ledge 23 is an extension of the surface of the first bracket 20 and comprises an offset 23C that continues into the remainder of the first bracket 20, thus creating an offset gap 23D between the wall 25 and the upper portion of first bracket 20. Alternatively, as shown in FIG. 4D, the ledge 23 also could be a curved member (as opposed to a planar member) projecting away from the appliance-facing surface 22. Or, as shown in FIG. 4E, one or more of the first portion 23A and second portion 24B could be curved. In each of these embodiments, ledge 23 includes a ledge support surface 24 that is located somewhere on ledge 23, depending on the design of the ledge 23, on which the cam 40 (described below) is coupled. Other variations of the ledge 23 and its varying styles of ledge support surface 24 are deemed to be commonly understood and included within the scope of what constitutes a ledge 23. In the preferred embodiments of the Figures, first bracket 20 includes two separate ledges 23, and each ledge 23 is a single planar member with a thickness of approximately 0.625 inches and a length of approximately 3 inches, and is disposed about the appliance-facing surface 22 at an angle of 45 degrees. The particular dimensions, however, depend on the material being used (steel, aluminum, wood, etc.), the method of manufacture (extrusion, forming, etc.), and the weight of the appliance. For example, if the first bracket is extruded aluminum, the thickness could be less, for example in the neighborhood of 0.038 inches. Additionally, the ledge 23 of the first bracket 20 might take on significantly different lengths, depending on how many ledges 23 are included on the first bracket 20, and on their relative locations. For example, for a first bracket 20 that is a continuous extrusion, the length of the ledge 23 would typically be the width of the first bracket 20 itself. By contrast, a first bracket 20 might be designed to have more than two ledges 23 (for example, 3, 4, 5, or more). The length of each of such ledges 23 would be a matter of design choice, based primarily on the weight of the appliance 60 and the dimensional constraints of the application.

The first bracket 20 is configured to support the rear portion of an OTR appliance, as will become more apparent below, both initially during installation prior to rotation of the cam 40, and in its final configuration after rotation of the cam 40. Although illustrated as a single-piece first bracket 20, this is not intended to be limiting. In some embodiments, the first bracket 20 may be two or more separate wall bracket pieces, each attached to the wall 25, for example at a predefined distance from each other, to support the over-the-range microwave cooking appliance.

Figure 5A:
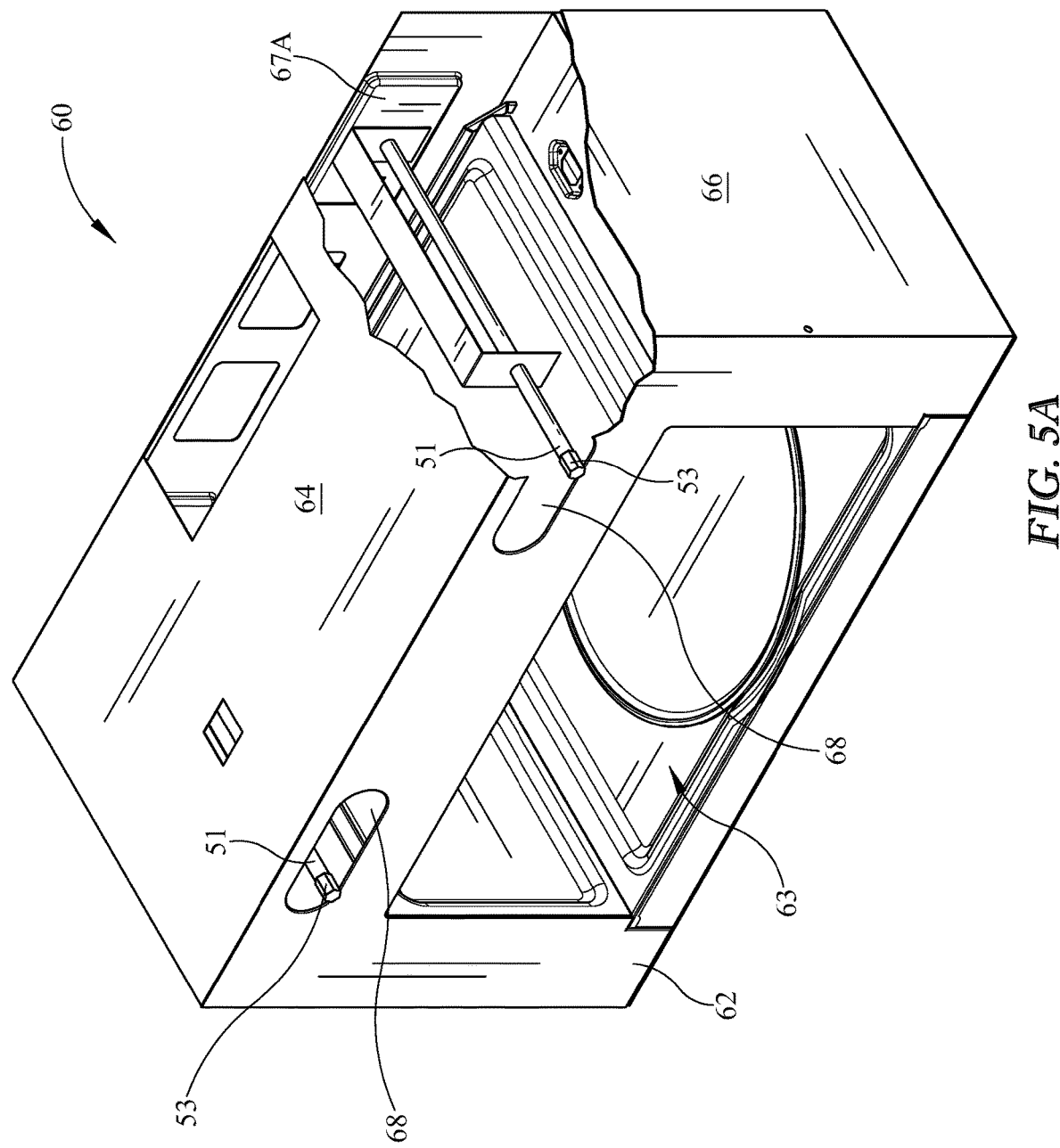
FIG. 5A is a front top perspective view with partial cutaway of an appliance showing the representative openings for engagement of a cam shaft extension, according to one embodiment.
Figure 5B:
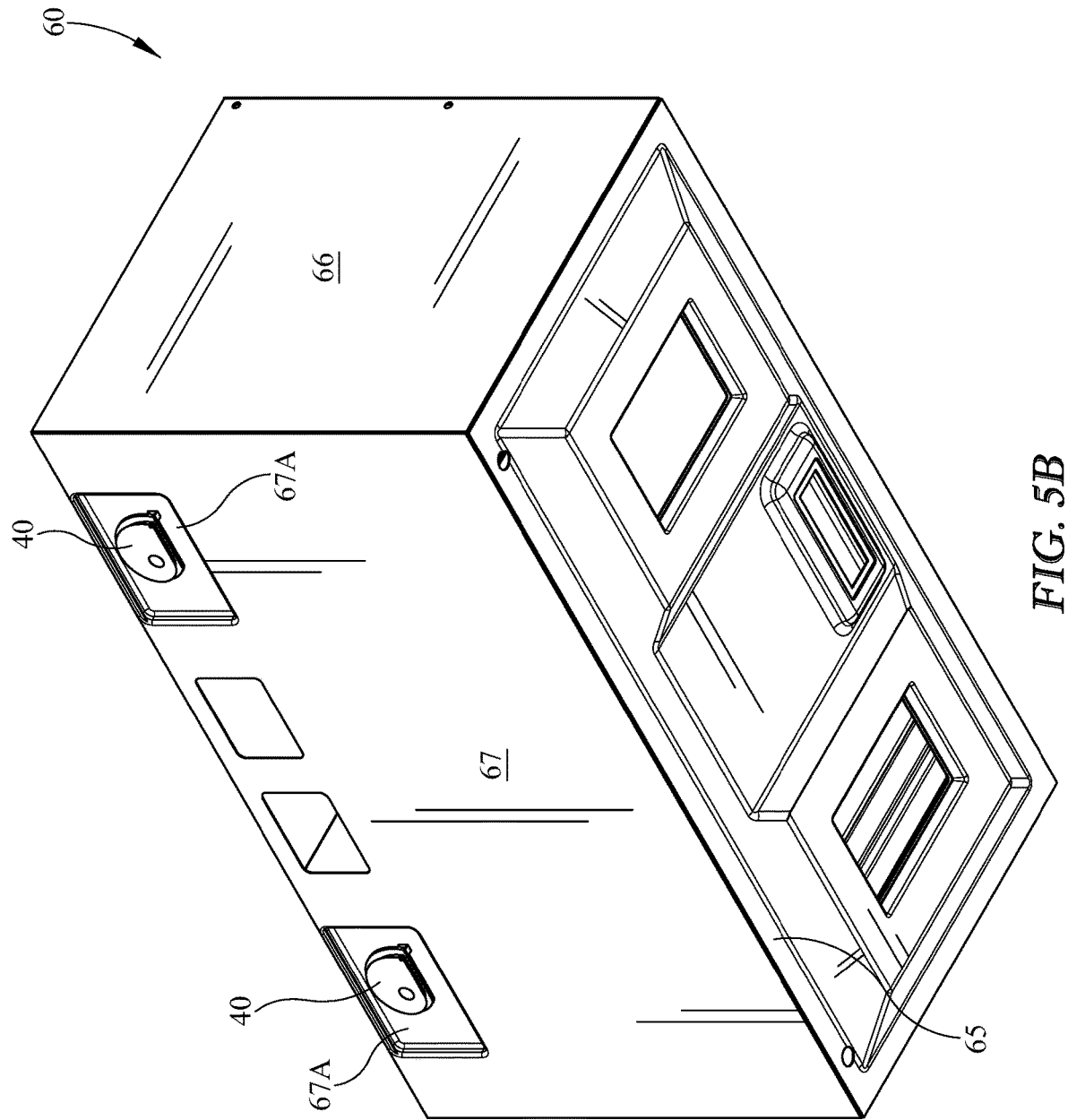
FIG. 5B is a rear bottom perspective of the appliance of FIG. 5A, according to one embodiment.

With reference now to FIGS. 5A and 5B, the appliance 60 front and rear views are shown. Appliance 60 typically has a housing enclosure 62 and a cooking cavity 63 therewithin. The housing enclosure 62 has a top 64, a bottom 65, sides 66, and a rear 67. The rear 67 abuts the wall 25 when the appliance 60 is mounted. One or more openings 68 extend through the housing enclosure 62 such that the opening 68 is open from a front of housing enclosure 62 to the rear 67 of housing enclosure 62. In the preferred embodiments described herein, the rear 67 includes one or more recesses 67A. Recess 67A serves to house the cam 40. The depth of the recess 67A can be varied based on various design parameters, but preferably the depth of recess 67A is adequate to house cam 40 such that cam 40 does not project beyond the rear 67. One feature of such a recess 67A is to protect the cam 40 during shipment and handling (rather than allowing cam 40 to project outwardly beyond rear 67). But this is not required, and indeed recess 67A is not required in some embodiments. A cover 69 is commonly provided that can be coupled to the housing enclosure 62 once installation is complete, so as to cover the opening 68 and the otherwise less-appealing appearance of the front of the housing enclosure 62.

Figure 6:
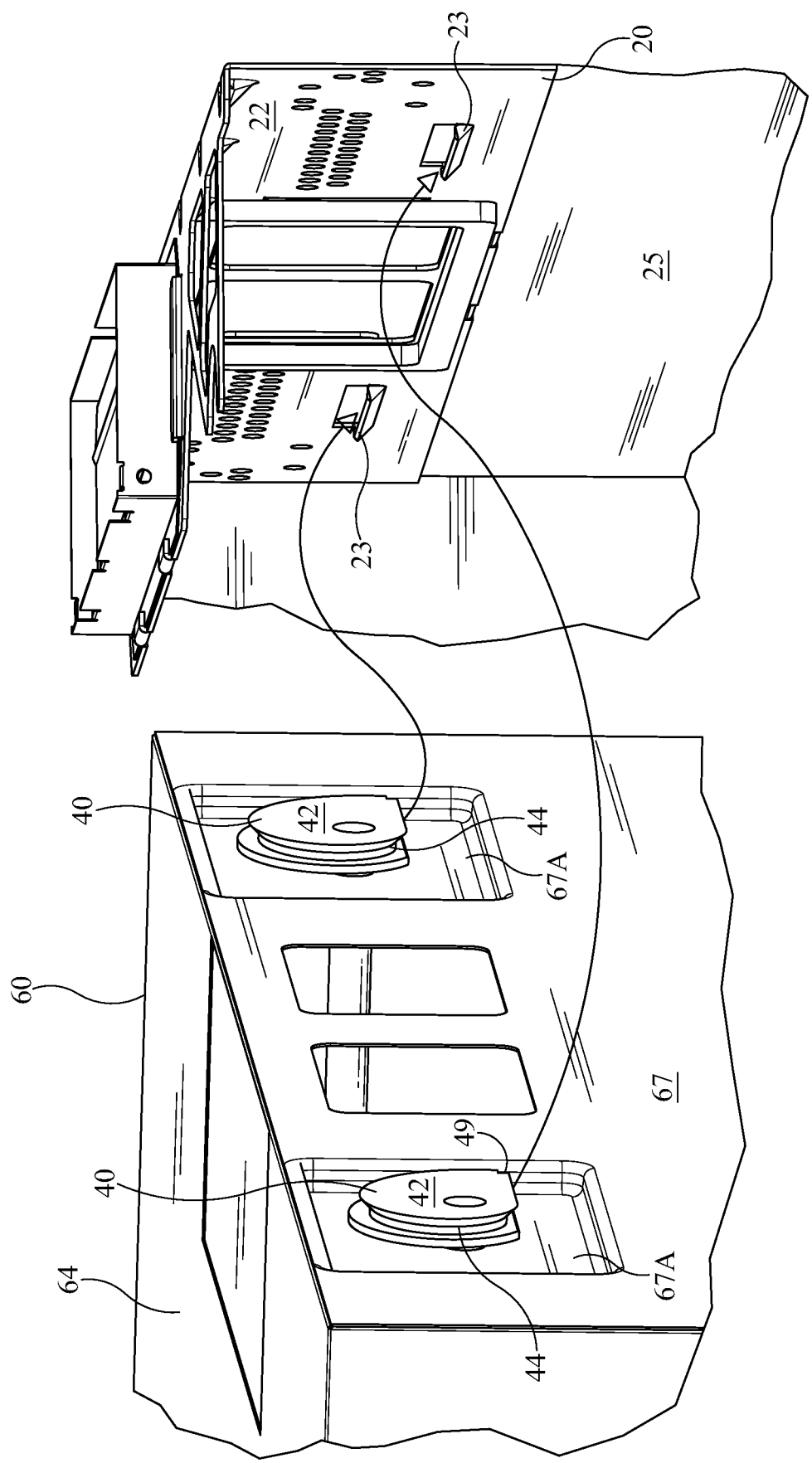
FIG. 6 is a rear perspective exploded assembly view of a portion of an appliance and a portion of a first bracket, according to an embodiment.
Figure 7:
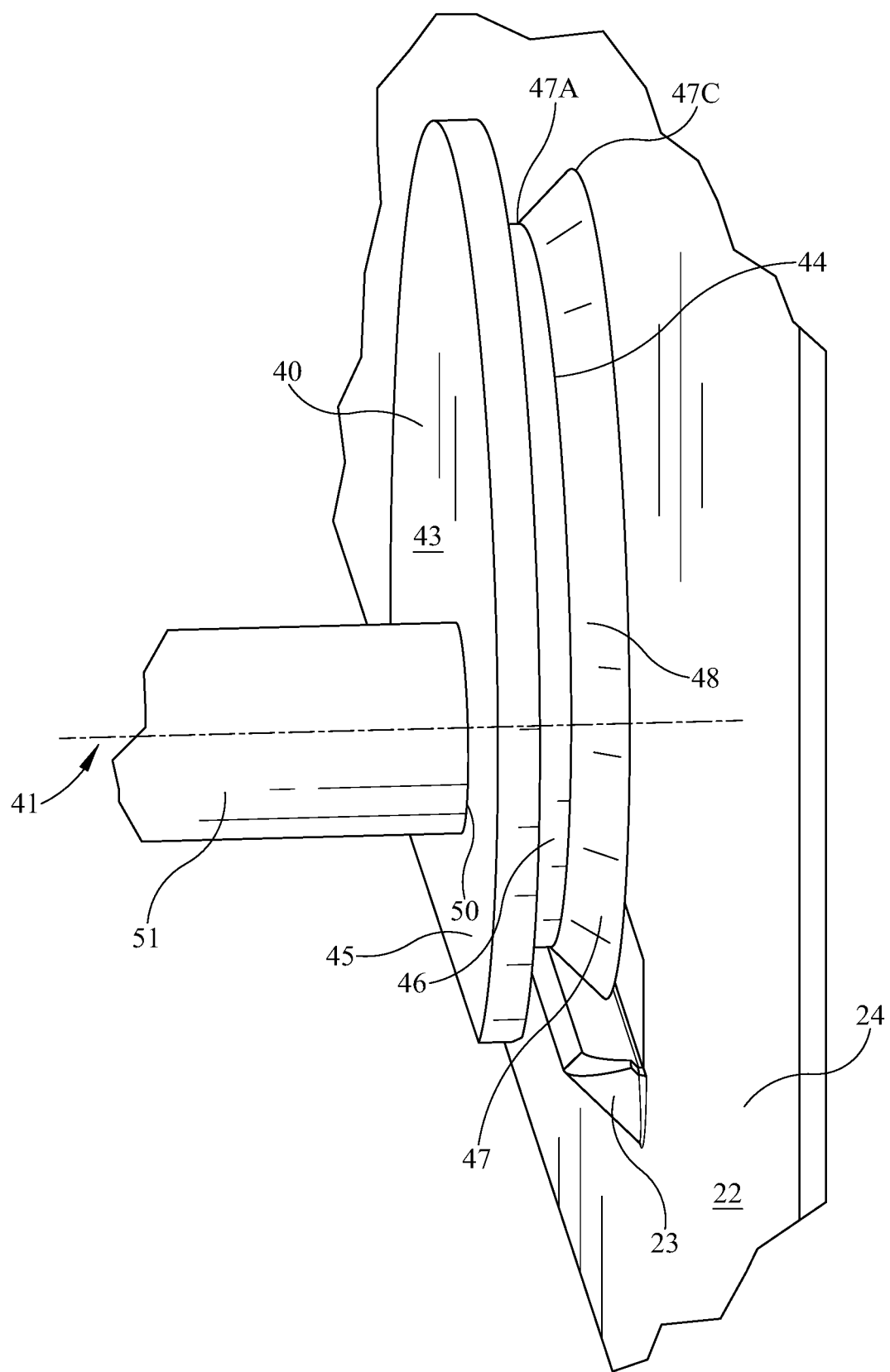
FIG. 7 is a close-up perspective view of the rear portion of an appliance according to one embodiment showing engagement of one cam with a first bracket.
Figure 8:
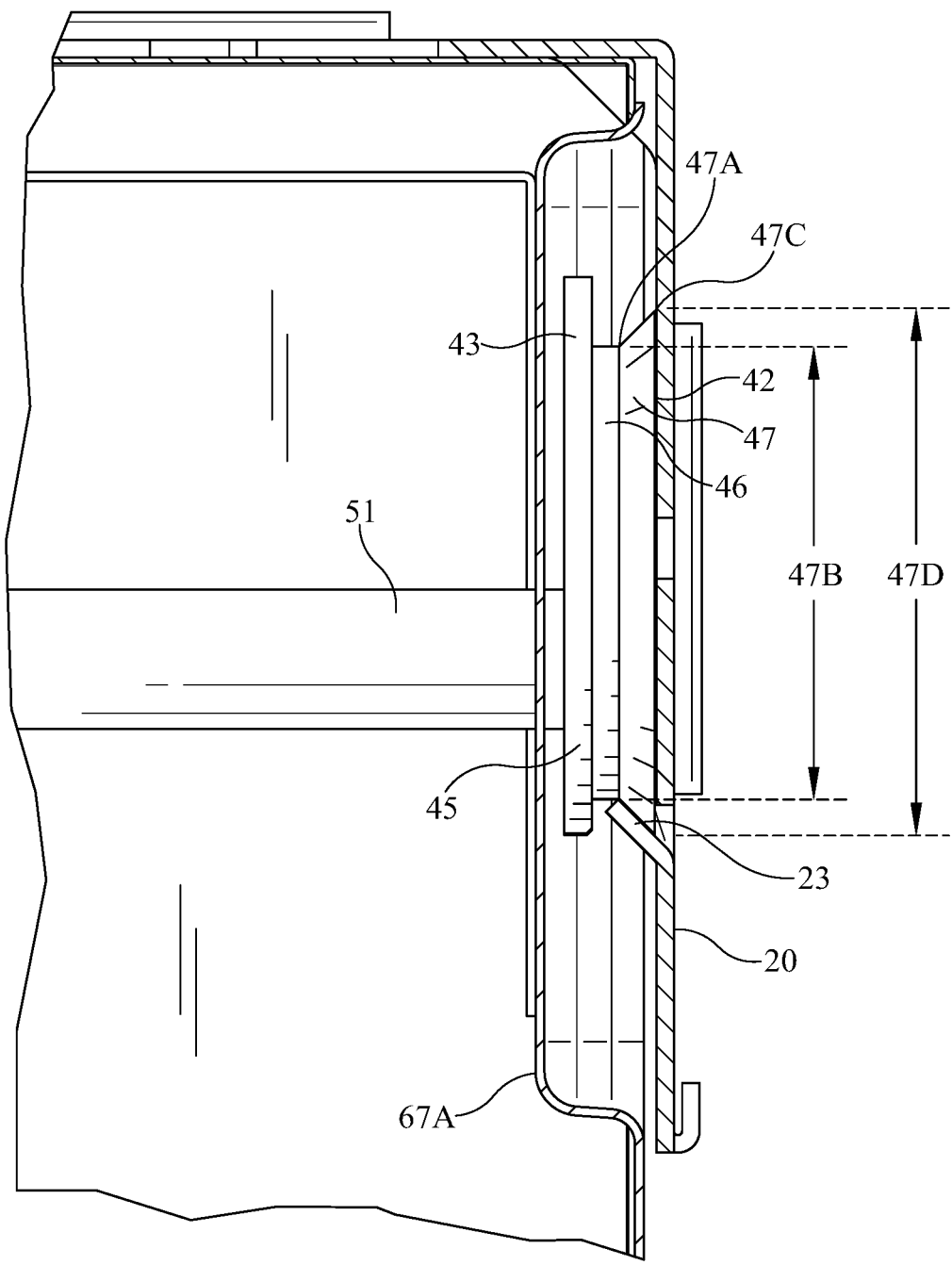
FIG. 8 is a partial sectional view of the rear portion of an appliance according to one embodiment showing engagement with a ledge of a first bracket.

With reference now to FIGS. 5B, 6, 7, and 12, a cam 40 is rotatably coupled to the rear 67 of the appliance 60, and in particular, is coupled within the recess 67A. The cam 40 is rotatable about its cam axis 41, which is coincident with a cam shaft 50. The cam 40 can comprise many well-known shapes, sizes, and styles of cams, with the relevant feature being that the cam 40 has a camming surface 44 that varies in radial distance from the cam axis 41. As shown, cam 40 includes a wall-facing surface 42 and an appliance-facing surface 43. In FIG. 8, wall-facing surface 42 and appliance-facing surface 43 are depicted as plane-parallel surfaces, but this is not required. One or both of wall-facing surface 42 and appliance-facing surface 43 can be, or can have portions that are, angled, curved, or otherwise variable in thickness at certain locations. FIG. 9 depicts various alternative cross-sectional shapes of embodiments of camming surface 44. In a preferred embodiment of cam 40 (some examples in FIGS. 6-8), a tiered or stepped cross-sectional shape is present, having an appliance portion 45, a middle portion 46, and a wall portion 47. The appliance portion 45 has a larger cross-sectional dimension than middle portion 46 or wall portion 47, but this is not required. The appliance portion 45 preferably just needs to have a cross-sectional dimension that is large enough so that cam 40 remains inside recess 67A (that is, for example, does not pull through the rear 67 of the appliance 60). A cam shaft extension 51 extends from the cam 40 through the appliance 60 such that a distal end 52 of the cam shaft extension 51 is accessible by a user at a convenient location. The middle portion 46 is optional, but when present allows a desired spacing and possible adjustability to be present in the interaction between the cam 40 and the ledge support surface 24. The wall portion 47 has a first perimeter surface 47A closest to the appliance portion 45, which has a first camming radius 47B. The wall portion 47 also has a second perimeter surface 47C, farthest from the appliance portion 45, which has a second camming radius 47D that is larger than the first camming radius 47B. The term "camming radius" is used to refer to the fact that the outer extent of the applicable surface being described is, or may be, a camming surface, such that it does not have a constant radius from the cam axis, but instead has an increasing radius from the cam axis 41 as the perimeter surface is traversed. As a result, the wall portion 47 contains an angled surface 48 to interact with the ledge 23 or ledge support surface 24.

Regardless of the cross-sectional shape of the camming surface 44, the camming surface 44 of cam 40 can, if desired, have portions that have a constant radius from the cam axis 41 (that is, portions that are circular with respect to the cam axis 41) in addition to portions that have variable radiuses from the cam axis 41 (that is, portions that are elliptical, parabolic, helical, or otherwise non-circular). The cam 40 is rotatable about its cam axis 41 and cam shaft 50 in, theoretically, a full 360 degrees. With reference to FIG. 10A, which is a front view through the appliance 60 of the first bracket 20 with the cam 40 shown, it is preferable that the cam 40 have a "home" position that is an initial position defining a particular orientation of the cam 40. This home position may be one that is either selectable by a user (e.g., by the user rotating the cam 40 to the "home" position), or perhaps one that has the cam 40 pre-disposed (e.g., perhaps biased in a pre-disposed orientation) in the "home" position. FIG. 10A depicts cam 40 in the home position. It is also preferable, but not required, that the rotation of the cam be limited to a smaller range of rotation, as but one example, from 0 degrees (home) to approximately 150 degrees. The cam 40 and/or first bracket 20 each or both can have various configurations of stops or detents in various positions to either encourage, discourage, or prevent certain extent of rotation. In the figures, one or more stops 26 can be coupled to the first bracket or to the appliance itself (e.g., in recess 67A), or to the second bracket 30 (if used). The stop 26 is located at a particular location (e.g., home position) such that cam 40 cannot be rotated in a particular position beyond the desired location. The camming surface 44, or some other aspect of the cam 40, can also have a mating or corresponding feature (e.g., groove 49) that interacts with the stop 26. Additional stops 26 and grooves 49, or other correspondingly mating structures, can be utilized at various locations around the camming surface 44 if additional rotational positions are desired to be encouraged, discouraged, or prohibited.

As discussed, the cam 40 home position occurs when a particular rotational position of the cam 40 is achieved (whether selected by a user; or "pre-selected" as a default position; or biased into an initial position via a spring or other biasing member). The cam 40 home position preferably occurs when the appliance 60 is to be placed onto the first bracket 20. The cam 40 may have a camming surface 44 that has a varying outer surface distance from the cam axis 41 along the perimeter thereof. For ease of description, three representative portions of the camming surface 44 are shown in FIGS. 10A and 10B. Cam first portion 44A is the section of the cam 40 that contacts the ledge 23 when the appliance 60 is in the appliance first position. Cam first portion 44A has a radius R1. Cam second portion 44B is the section of the cam 40 that contacts the ledge 23 when the appliance 60 is being moved upwardly away from appliance first position toward an appliance final position. Cam second portion 44B has a radius R2. Cam third portion 44C is the section of the cam 40 that contacts the ledge 23 when the appliance 60 is has been moved upwardly to its appliance final position. Cam third portion 44C has a radius R3.

The cam 40 home position occurs when a first portion 44A of camming surface 44 is located directly below cam axis 41. In this position, the cam first portion 44A (or, in some embodiments, opening top surface 34) rests on ledge support surface 24. With reference to FIGS. 7, 10A, and 10B, a user can move the appliance 60 vertically away from its appliance first position toward appliance final position by rotating the cam 40. In the Figures, cam 40 is rotatable by engaging a distal end 52 of a cam shaft extension 51 and rotating the cam shaft extension 51 clockwise to raise the appliance, and counter-clockwise to lower the appliance, as depicted by the arrows. When the cam 40 is in the home position, it is possible that first portion 44A of camming surface 44 is either in contact with ledge support surface 24, or perhaps is very nearly in contact. In general, a user can then rotate the cam 40 in any of several methods. If accessible by a user's hand, it is possible for the user to simply rotate the cam 40 manually by grabbing the cam 40 and rotating. Alternatively, the cam shaft 50 may have a tool engaging structure, such that a user may couple a tool 54 with the tool engaging structure, and rotate the cam shaft 50 via tool 54. Alternatively, as shown in the figures, the cam shaft 50 may be elongated to have a cam shaft extension 51. Preferably, the cam shaft extension 51, as shown in the Figures, can extend all or partially through the housing enclosure 62, such that a terminal end of cam shaft extension 51 is accessible by a user at a more convenient location. Preferably the cam shaft extension 51 has a distal end 52 having tool engaging structure 53 that can receive a tool 54 for rotating the cam shaft 50, and thereby the cam 40. It is possible that cam shaft extension 51 can either be permanently part of cam shaft 50, or can be removably attached to cam shaft 50.

With particular reference to FIGS. 5B and 6, the rear 67 is shown of a preferred embodiment. The cam 40 is visible as being rotatably coupled to, and situated within, recess 67A. As stated, the recess 67A provides physical protection to the cam 40 during shipping and handling. The recess 67A also facilitates the direct surface contact between the rear 67 of the appliance 60 once it is finally mounted on the first bracket 20. Alternative embodiments can involve the use of a second bracket that is mounted to the rear 67 of the appliance 60. This can occur for appliances that do not have a recess 67A, or for appliances that do not have a cam 40 rotatably coupled thereto in any fashion (that is, regardless whether mounted in a recess 67A or mounted flush with the rear 67). Providing a second plate 30, to which a cam 40 (as discussed herein) is rotatably mounted, might be beneficial as well because it eliminates the need to mount the cam 40 to the appliance itself. This can facilitate a more universal type of mounting system, where a given second bracket 30 might be utilizable for a wide arrange of appliances.

Figure 11:
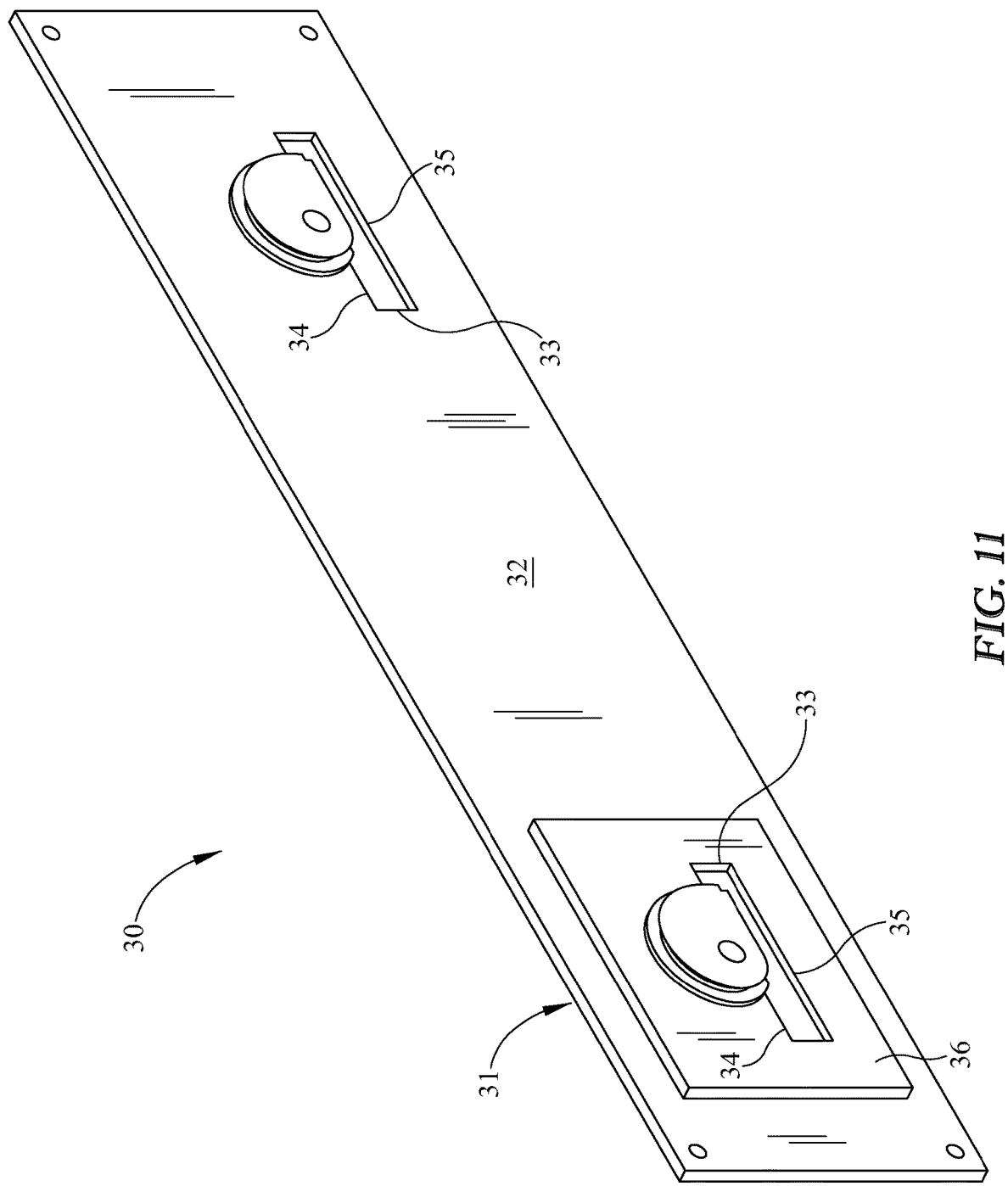
FIG. 11 is a perspective view of a second bracket, according to an embodiment.
Figure 12:
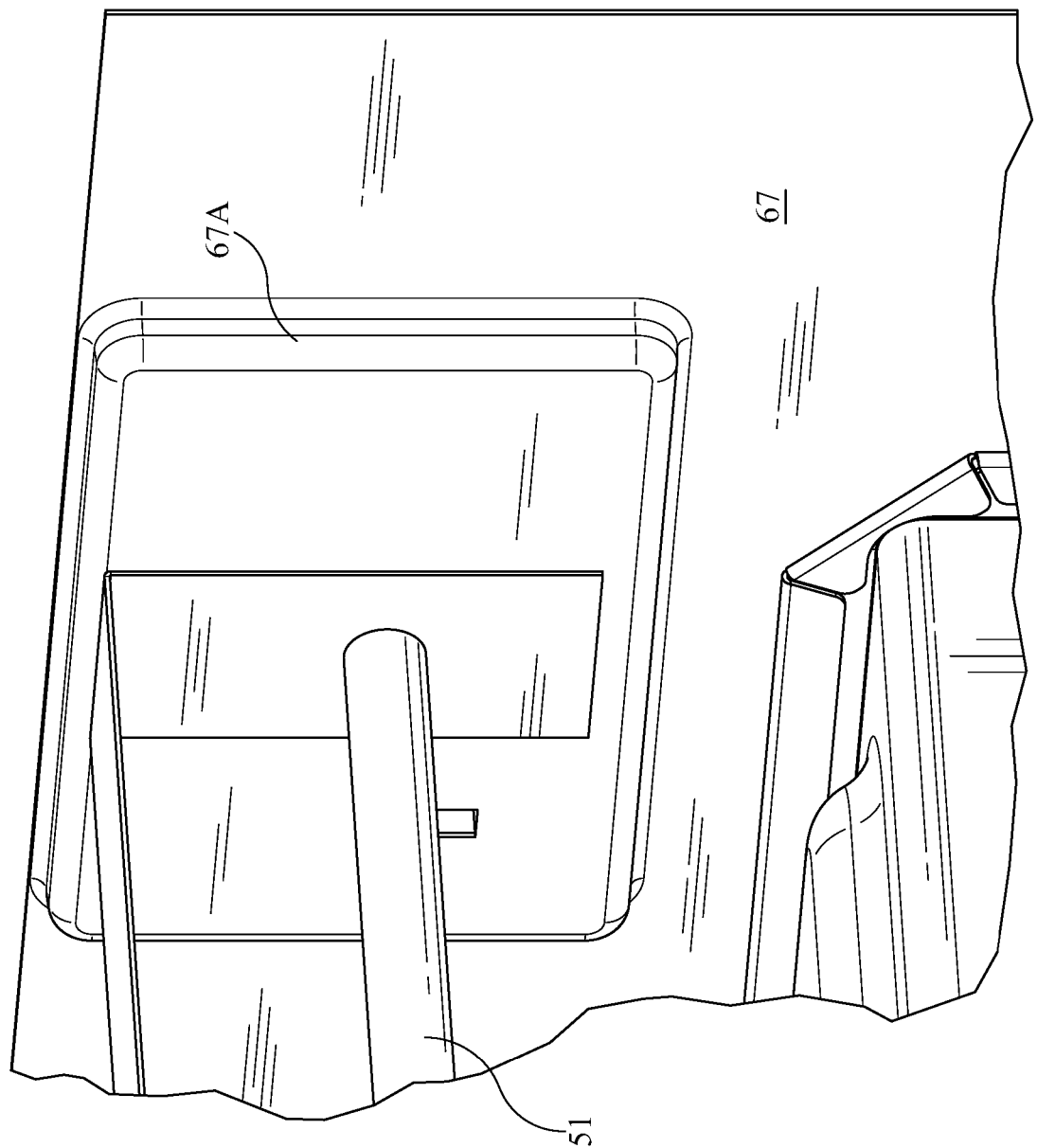
FIG. 12 is an internal rear perspective cutaway view of an appliance, according to one embodiment.

FIG. 11 illustrates an exemplary embodiment of a second bracket 30. In embodiments utilizing a second bracket 30, the one or more second brackets 30 are coupled to the rear 67. The example shown in FIG. 11 shows, for ease of reference, two different types of designs in the same figure: (1) one end of the second bracket 30 is shown having an embossing 36 (that can be designed to mate with recess 67A) and (2) the other end of the sample second bracket 30 is shown without any such embossing. Each second bracket 30 may take many shapes and sizes, and may have additional features, structures, openings, and surfaces that comprise the second bracket 30, but typically will have a wall-facing surface 31 and an opposite appliance-facing surface 32. In embodiments of the second bracket 30 containing an embossing 36, the embossing 36 may, for example, have a shape and size that is designed to fit within the recess 67A of the rear 67 of the appliance 60. In such embodiments, the size of the embossing 36 is large enough to fit around the ledge 23 of the first bracket 20. In other embodiments, the second bracket 30 may not have an embossing 36 and, instead, may be basically planar. The second bracket has an opening 33 therein to receive the ledge 23 therethrough. The opening 33 can take on many shapes and sizes, but in the embodiments shown in the Figures, the opening 33 is a rectangular opening having an opening top surface 34 and an opening bottom surface 35. The opening 33 may alternatively be a notch in the second bracket 30 having only an opening top surface 34 and no opening bottom surface. The opening 33 is dimensioned so as to receive therewithin the ledge 23 of the first bracket 20. The distance between the opening top surface 34 and the opening bottom surface 35 (if present) is somewhat a matter of choice, but is dependent upon the size and shape of the ledge 23 and of the ledge support surface 24. At a minimum, however, the distance between the opening top surface 34 and the opening bottom surface 35 must be large enough to receive the relevant ledge 23 therewithin. Typically the design and dimensions of the ledge 23 for embodiments utilizing a second bracket 30 can be similar to those where a second bracket 30 is not used. For embodiments using a second bracket 30, the distance between the opening top surface 34 and the opening bottom surface 35 is dependent on the desired shape and size of the ledge 23. It is conceivable that this distance could be anything between approximately 0.0625 inches (or less) to three inches (or more), but more likely is approximately 0.25 inches.

A method of installing an OTR appliance is also described herein. In practice, a user will mount first bracket 20 to, typically, a wall at desired location. As discussed above, the desired location can be, but is not limited to be, between a first wall cabinet 80 and a second wall cabinet 81 and beneath an upper wall cabinet 82. The first bracket 20 will ideally be anchored into wall studs or some other structure providing adequate support for the appliance. The first bracket 20 is mounted such that the ledge 23 projects upwardly away from the wall 25. The location on the wall 25 for mounting the first bracket 20 is easily determined by features inherent to the preferred embodiment of the first bracket 20. For example, a user first finds the center of the opening of the wall 25. The first bracket 20 has a center line indicator thereon to match up to the center of the opening. The top of the first bracket 20 itself can be a physical stop for the first bracket 20, such that when the first bracket 20 is abutted against the bottom surface 83 (or some other desired object), the first bracket 20 automatically is situated at the appropriate height beneath the upper wall cabinet 82 in order for the ledge 23 of the first bracket 20 to properly receive the cam 40.

Figure 13:
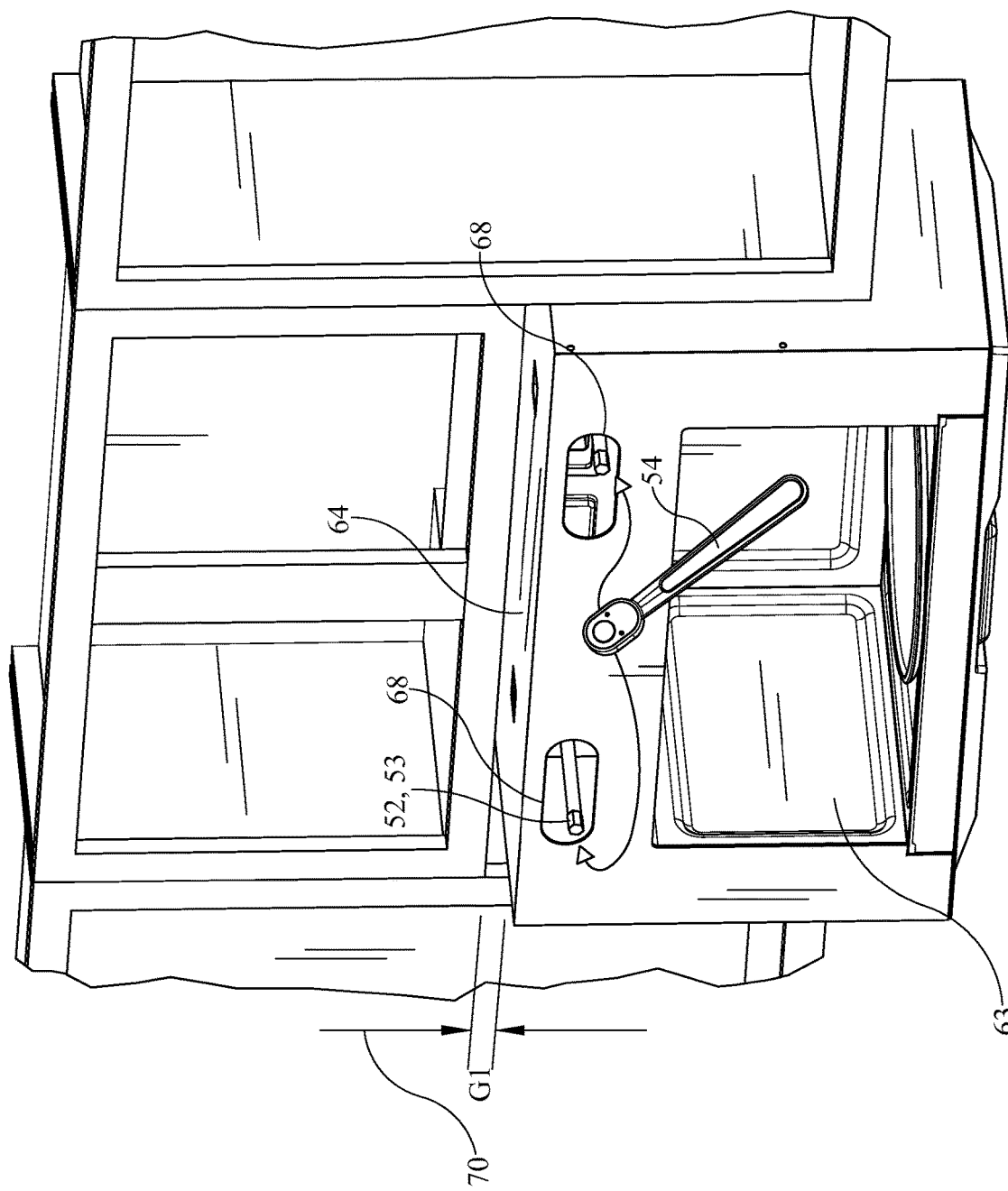
FIG. 13 is a perspective view of an appliance occupying a first position, prior to rotation of the cams, according to an embodiment.
Figure 14:
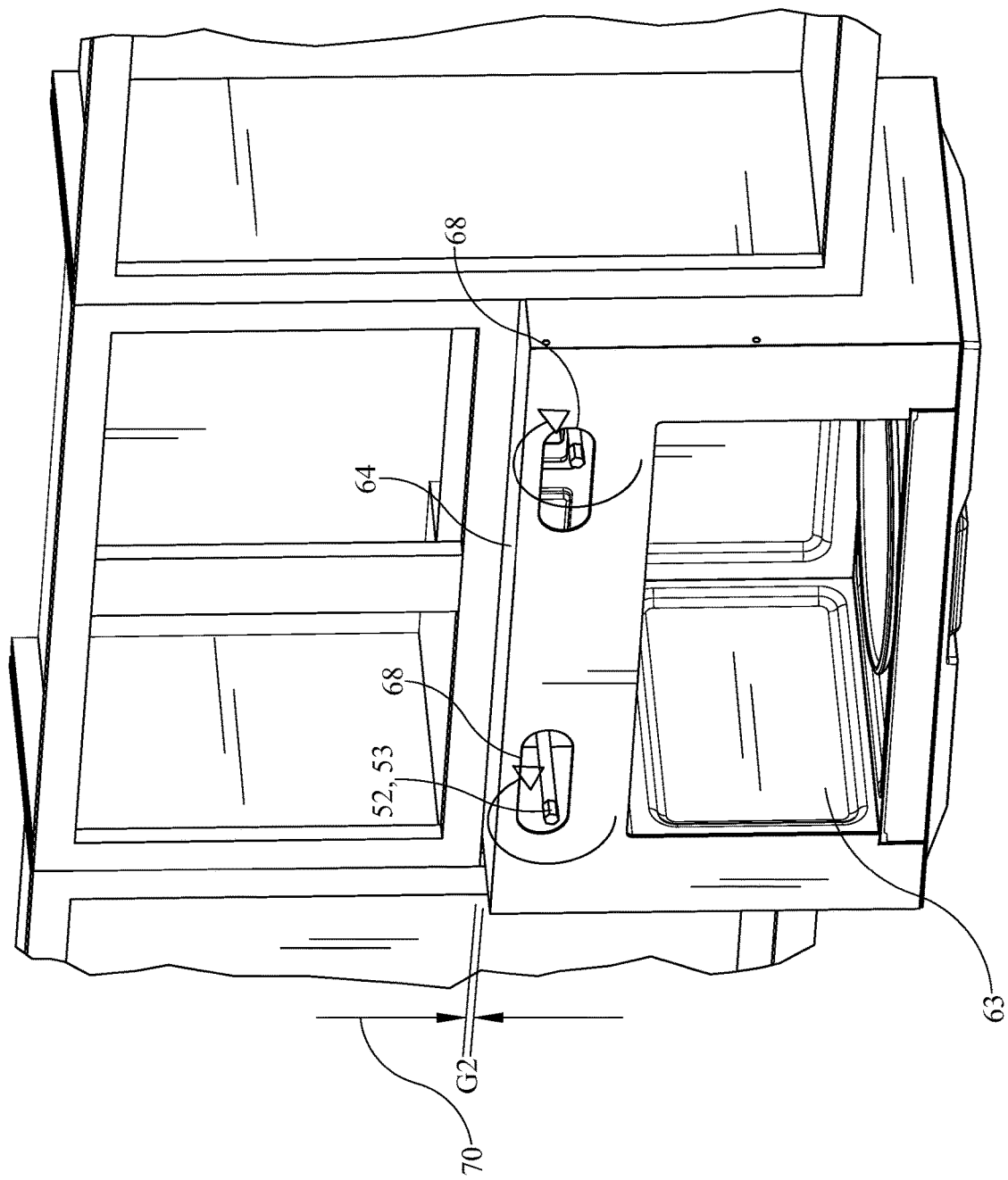
FIG. 14 is a perspective view of the appliance of FIG. 13 occupying an appliance final position after the cams have been rotated.

Referring now to FIGS. 13 and 14, after the first bracket 20 is mounted to the wall 25, the appliance 60 is placed onto the first bracket 20. This step itself can involve one or more variations of steps. In some embodiments, including a preferred embodiment as described above, the appliance 60 may contain recesses 67A on its rear 67 and cams 40 within the recesses 67A. In other embodiments, the appliance 60 will be made to have attached to it on its rear 67 one or more second brackets 30 that are to matingly receive the ledges 23 of the first bracket 20. As discussed above, in embodiments using the second bracket 30, the second bracket 30 includes the cam 40.

Next, the user lifts the appliance 60 to a height adequate to allow the lowest portion of the cam 40 to clear the top of the ledge 23 as the appliance 60 is moved horizontally until the rear 67 contacts the appliance-facing surface 22 of the first bracket 20. Then, maintaining contact between the rear 67 and the first bracket 20, the user allows the appliance 60 to move vertically downwardly until such time as the camming surface 44 of the cam 40 rests on the ledge 23. In alternative embodiments using a second bracket 30 that has opening 33 therein, the appliance can alternatively be allowed to move vertically downwardly until such time as the opening top surface 34 rests on the ledge 23. In either case, once the cam 40 or the opening top surface 34 rests on the ledge 23, the appliance 60 is now vertically supported by the first bracket 20, and the user can release the appliance 60 without fear of it falling. This position, shown in FIG. 13, when the cam 40 or opening top surface 34 is resting on first bracket 20 height position is referred to herein as the appliance first position. Preferably when the appliance 60 is in the appliance first position, the cam 40 is in the home position. As discussed above, the cam home position may be achieved by user input (rotating the cam to home position) or by default (the cam 40 being biased to home position).

The ledge 23 provides a blocking surface to prevent the appliance 60 being disconnected from the first bracket 20 in a horizontal, as well as vertical, direction. Stated otherwise, pulling the appliance 60 horizontally will result in a portion of the appliance-facing surface 43 of the cam 40 (in the embodiment shown in FIGS. 6-8, the angled surface 48) eventually making contact with an inside (or wall-facing) surface of the ledge 23 or second portion 23B, thus preventing the appliance from being pulled off the wall horizontally. Basically, ledge 23 or ledge second portion 23B provides this barrier, such that the only way the appliance 60 can be removed from the first bracket 20 is by lifting the appliance 60 vertically a distance adequate to allow the cam 40 (or the opening top surface 34) to clear the ledge 23 or ledge second portion 23B and pulling the appliance 60 horizontally away from the first bracket 20.

With continuing reference to FIG. 13, when the appliance 60 is in appliance first position resting on ledge support surface 24 of first bracket 20, a gap 70 exists between the top 64 of the appliance 60 and the bottom surface 83 of the upper wall cabinet 82. In particular, the gap 70 will have a first size (corresponding to a gap initial distance G1) when the appliance is in appliance first position. The gap 70 will have a second size (corresponding to a gap final distance G2) after the appliance 60 has been raised via the cam 40 (described below). G2 is smaller than G1. The size of the gap initial distance G1 is related to the location, size, and design of the ledge 23 and ledge support surface 24 and its position and orientation on first bracket 20, as well as the amount of clearance desired for lifting the appliance 60 onto the first bracket 20, as well as the size, shape, and design of the camming surface 44 of the cam. The size of gap final distance G2 is additionally related to the particular design and features of the cam 40 and its relationship to first bracket 20, as described below. Typically, the amount of vertical movement of the appliance 60 to be achieved after the appliance 60 is in appliance first position is the amount of vertical travel enabled as the appliance 60 is raised by the cam 40 to move from gap initial distance G1 to gap final distance G2. The structures and methods employed by the embodiments shown in the Figures to raise the appliance 60 from gap initial distance G1 to gap final distance G2 involve the cam 40 and its related structures and its interaction with the ledge support surface 24 of ledge 23.

Next, with reference to FIGS. 13 and 14, the user imparts a clockwise rotation on the cam shaft extension 51 to progressively move different portions of camming surface 44 into contact with the ledge support surface 24. FIG. 13 depicts the appliance 60 in the appliance first position (resting on the first bracket 20 when the cam 40 is in it home position). The radius at this home position is the radius R1 at first portion 44A. As the user rotates the cam shaft extension 51, the second portion 44B—having a radius R2—of the camming surface 44 rotates into contact with ledge support surface 24. Because the radius R2 is larger than radius R1, the appliance is raised and moves closer to the bottom surface 83 in an amount equal to the difference between the R2 and R1. This moves the appliance 60 upward toward the bottom surface 83 of the upper wall cabinet 82, and reduces the size of the gap 70 in the process. In similar fashion, the user continues rotating cam shaft extension 51 to bring third portion 44C— having an even larger radius R3—into contact with ledge support surface 24. This process continues as the user continues to rotate the cam shaft extension 51 to progressively bring portions of the camming surface 44 having increasing radii into contact with the ledge support surface 24, thus raising the appliance 60 in proportion to the increasing radii contacting the ledge support surface 24. Eventually, the appliance 60 is raised the full or desired amount, such that the gap 70 that once existed between the bottom surface 83 of the upper wall cabinet 82 and the top 64 of the appliance has been closed, either completely or to the extent possible in light of tolerances or uneven surfaces that are sometimes encountered. Once this is achieved, the appliance 60 is in its appliance final position as shown in FIG. 14, and the mounting process is generally complete.

Figure 15A:
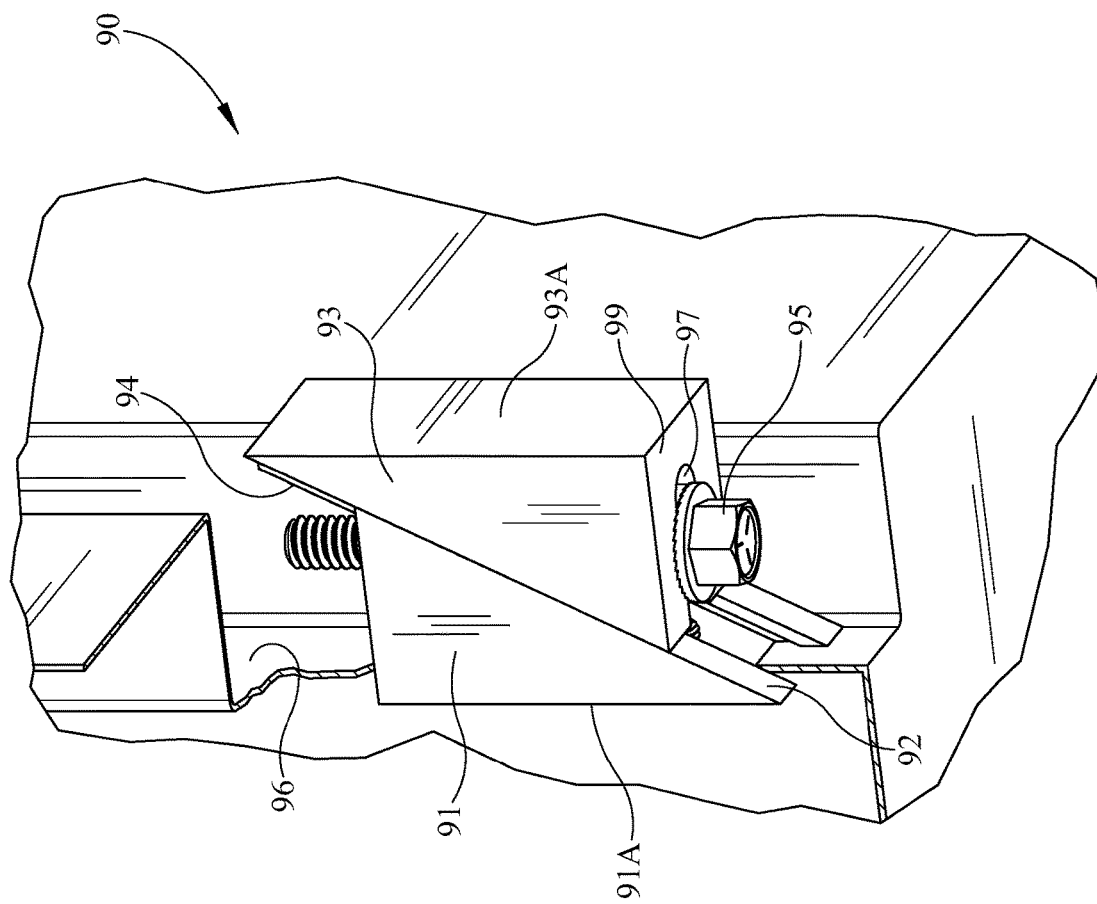
FIG. 15A is a perspective cutaway view of a rear corner of an appliance according to an embodiment showing an example wedge screw mechanism.
Figure 15C:
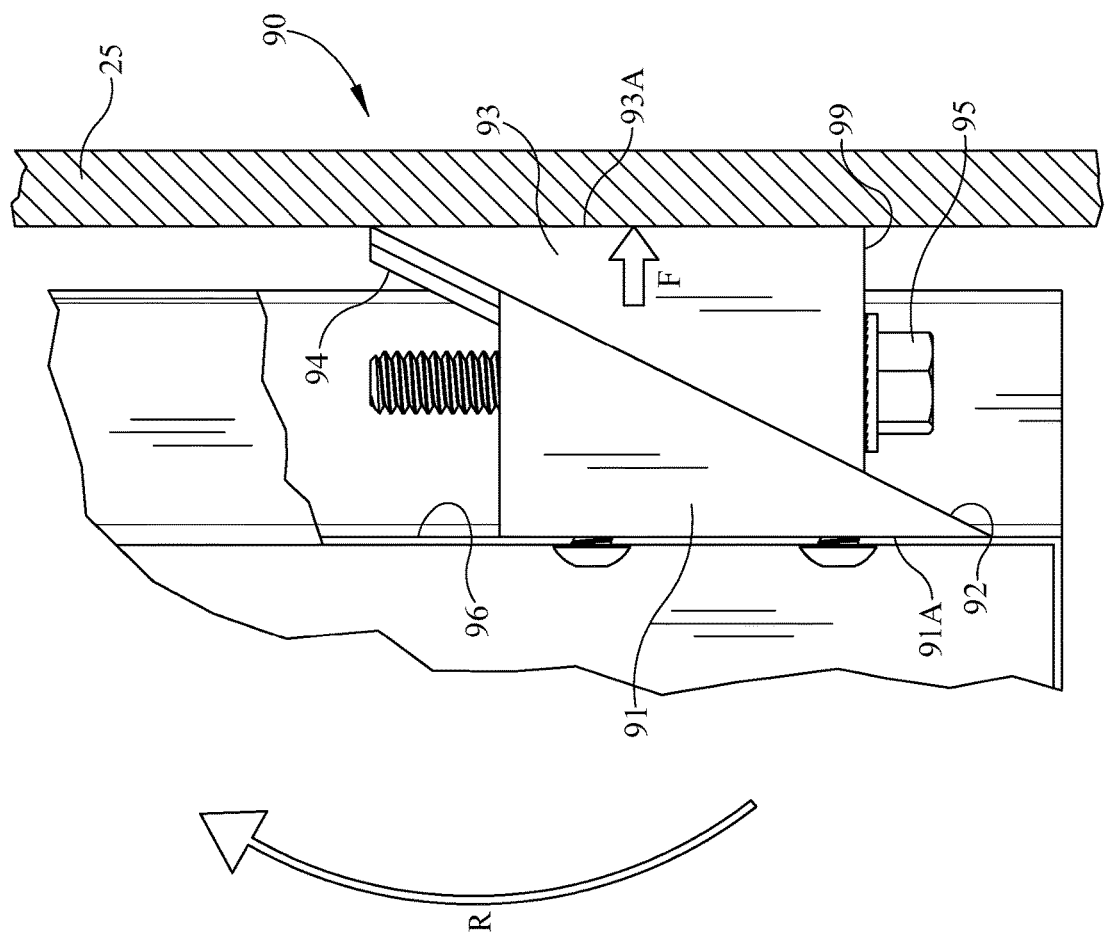
FIG. 15C is a view similar to that of FIG. 15B showing the wedge screw mechanism of FIG. 15A, showing the first wedge in a second spatial relationship to the second wedge.

In certain circumstances (uneven walls and/or upper wall cabinet 82, as two examples), rotating the cam 40 its full extent, which moves appliance 60 vertically upward into appliance final position, might not provide closure of the gap 70 to the extent desired by a user. Additional fine adjustment to more fully close the gap 70 might be desired. FIGS. 15A-15C depict an embodiment for achieving full closure of the gap 70. In one embodiment, one or more wedge screw mechanisms 90 may be incorporated into the appliance 60. As depicted, a first wedge 91 having a front surface 91A and an angled surface 92, and a second wedge 93 having a rear surface 93A and an angled surface 94, may be coupled together via a bolt 95. The appliance 60 can be fitted with wedge mechanisms 90 in one or both bottom rear corners of the housing enclosure 62 of appliance 60, as an example. In particular, the housing enclosure 62 may incorporate a channel 96 at the rear 67. First wedge 91 and second wedge 93 are dimensioned to fit within the channel 96. First wedge 91 and second wedge 93 are able to be coupled to each other in a way that allows angled surface 92 to slidingly engage angled surface 94. One exemplary form of coupling first wedge 91 to second wedge 93 is shown in the Figure as a dovetail or other form of sliding tongue-and-groove attachment. One of the wedges, e.g., first wedge 91, is fastened to the appliance 60 or channel 96 so as to fix first wedge 91 to the appliance 60. First wedge 91 and second wedge 93 each have a through-hole 97 that aligns. The through-hole 97 in the first wedge 91 contains threads 98 that threadingly receive the threads of the bolt 95. The through-hole 97 in the second wedge 93 typically does not contain threads, but does have an abutting surface 99 against which the bolt 95 can act to provide a force on the first wedge 91 that allows the bolt 95 to move the second wedge 93 either toward or away from the first wedge 91, depending on the rotation of the bolt 95.

To operate the wedge screw mechanism 90, a user engages the head of the bolt 95 with a tool. The head of the bolt 95 can take many known forms for screws and bolts, including a male geometric structures (such as triangular, square, pentagonal, or hex heads, and the like) that are accessible by mating sockets or wrenches, as well as female geometric structures (such as, for example, slotted or cross type openings; cruciform openings (e.g., Phillips); internal polygonal openings (e.g., triangular, square, hex, "star" and the like); internal hexalobular opening (e.g., Torx, and the like) or any other known form of engageable structures that can receive and impart a rotation force. As the user imparts a rotation force to the head of the bolt 95, the engagement of the threads of the bolt 95 with threads 98 of first wedge 91 moves second wedge 93 with respect to first wedge 91 in a manner that forces angled surface 94 to slide along angled surface 92. Because first wedge 91 is fixed to the appliance 60, this sliding wedging action forces rear surface 93A into contact with wall 25. As the wedging action continues upon further rotation of the bolt 95, a force "F" (shown in FIG. 15C) normal to the wall 25 is imparted on the appliance 60. Because the wedge screw mechanism 90 is located near the bottom 65 of the appliance 60, this normal force F pushes the bottom of the appliance 60 away from the wall 25. And, because the appliance 60 is coupled to the wall 25 via the cam 40 and ledge 23 (which are at a location that is vertically above the wedge screw mechanism 90), the appliance 60 rotates upwardly and outwardly from the wall 25 (as indicated by the rotation "R" in FIG. 15C) about the cam 40/ledge 23 location, which acts as a fulcrum. This results in the front and top 64 of the appliance 60 rotating upwardly toward the bottom surface 83 of the upper wall cabinet 82, thus closing the gap 70. Thus, the user can achieve the desired amount of gap 70 closure by adjusting the relative locations of first wedge 91 and second wedge 93 via bolt 95, achieving a zero gap if desired.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. An over-the-range cooking appliance comprising:
an enclosure with a cooking cavity configured to receive food, wherein the enclosure includes a top surface, a bottom surface, a rear surface, side surfaces, and a front surface; and
one or more wedge screw mechanisms, wherein the rear surface includes the one or more wedge screw mechanisms configured to decrease a gap between the top surface and a bottom surface of an obstacle.

2. The over-the-range cooking appliance of claim 1 wherein said rear surface includes one or more channels, wherein the one or more wedge screw mechanisms are positioned in the one or more channels.

3. The over-the-range cooking appliance of claim 1 wherein at least one first wedge screw mechanism of the one or more wedge screw mechanisms is in a first bottom corner of the rear surface of the enclosure.

4. The over-the-range cooking appliance of claim 3 wherein at least one second wedge screw mechanism of the one or more wedge screw mechanisms is in a second bottom corner of the rear surface of the enclosure.

5. The over-the-range cooking appliance of claim 1 wherein the one or more wedge screw mechanisms includes a first wedge and a second wedge interconnected by a threaded member to provide the second wedge to slide along the first wedge.

6. The over-the-range cooking appliance of claim 5 wherein the threaded member rotates perpendicular to a force applied from the one or more wedge screw mechanisms to a wall beneath the obstacle.

7. The over-the-range cooking appliance of claim 5 further comprising a tongue-and-groove engagement between the first wedge and the second wedge.

8. The over-the-range cooking appliance of claim 5 wherein each one of the first wedge and the second wedge includes an angled surface in sliding engagement therebetween.

9. The over-the-range cooking appliance of claim 1 further comprising a bracket having a wall-facing surface and an appliance-facing surface, wherein the appliance is coupled to the bracket.

10. The over-the-range cooking appliance of claim 9 wherein the appliance pivots about the bracket.

11. The over-the-range cooking appliance of claim 9 wherein the bracket is positioned vertically above the one or more wedge screw mechanisms.

12. An over-the-range cooking appliance comprising:
an enclosure with a cooking cavity configured to receive food, wherein the enclosure includes a top surface, a bottom surface, a rear surface, side surfaces, and a front surface;
a first wedge having a first angled surface opposing a rear surface;
wherein the rear surface of the enclosure includes a second angled surface; and
wherein the first angled surface of the first wedge slidably engages the second angled surface between a first sliding position and a second sliding position, wherein in the first sliding position the rear surface of the first wedge is closer to the rear surface of the enclosure than when in the second sliding position.

13. The over-the-range cooking appliance of claim 12 further comprising a second wedge having the second angled surface.

14. The over-the-range cooking appliance of claim 12 further comprising a threaded member operating the first angled surface between the first sliding position and the second sliding position.

15. The over-the-range cooking appliance of claim 12 wherein the rear surface of the enclosure includes a channel having the second angled surface.

16. The over-the-range cooking appliance of claim 12 further comprising a bracket positioned vertically above the first wedge, wherein the appliance pivots about the bracket.

17. The over-the-range cooking appliance of claim 12 wherein the rear surface of the first wedge is parallel to the rear surface of the enclosure in both the first sliding position and the second sliding position.

18. The over-the-range cooking appliance of claim 1 wherein the one or more wedge screw mechanisms include a first angled surface and a second angled surface in sliding engagement therebetween.

19. The over-the-range cooking appliance of claim 18 wherein the one or more wedge screw mechanisms include a first wedge having the first angled surface.

20. The over-the-range cooking appliance of claim 19 wherein the one or more wedge screw mechanisms include the rear surface having the second angled surface.

21. The over-the-range cooking appliance of claim 20 wherein the rear surface includes a second wedge having the second angled surface.

\* \* \* \* \*